(12) United States Patent
Yamamoto et al.

(10) Patent No.: US 11,131,253 B2
(45) Date of Patent: Sep. 28, 2021

(54) CONTROL DEVICE FOR ENGINE

(71) Applicant: Mazda Motor Corporation, Hiroshima (JP)

(72) Inventors: Takahiro Yamamoto, Hiroshima (JP); Toshiaki Nishimoto, Hiroshima (JP); Takaya Okugawa, Hiroshima (JP); Takafumi Nishio, Otake (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 151 days.

(21) Appl. No.: 16/493,303

(22) PCT Filed: Mar. 19, 2018

(86) PCT No.: PCT/JP2018/010696
§ 371 (c)(1),
(2) Date: Sep. 12, 2019

(87) PCT Pub. No.: WO2018/173990
PCT Pub. Date: Sep. 27, 2018

(65) Prior Publication Data
US 2021/0140378 A1    May 13, 2021

(30) Foreign Application Priority Data

Mar. 23, 2017 (JP) .............................. JP2017-057411

(51) Int. Cl.
*F02D 13/06* (2006.01)
*F01L 1/344* (2006.01)
(Continued)

(52) U.S. Cl.
CPC ............ *F02D 13/06* (2013.01); *F01L 1/3442* (2013.01); *F01L 13/0005* (2013.01);
(Continued)

(58) Field of Classification Search
USPC ...................................................... 123/90.15
See application file for complete search history.

(56) References Cited

U.S. PATENT DOCUMENTS

| | | | |
|---|---|---|---|
| 2008/0047509 A1* | 2/2008 | Sellnau .................. | F01L 1/185 123/90.15 |
| 2011/0016958 A1* | 1/2011 | Cinpinski ............. | F02D 41/221 73/114.43 |

(Continued)

FOREIGN PATENT DOCUMENTS

| | | |
|---|---|---|
| CN | 105189977 A | 12/2015 |
| JP | 2010-1750 A | 1/2010 |

(Continued)

OTHER PUBLICATIONS

International Search Report and Written Opinion dated Jun. 26, 2018 for PCT/JP2018/010696 filed on Mar. 19, 2018, 10 pages including English Translation of the International Search Report.

*Primary Examiner* — Patrick Hamo
*Assistant Examiner* — Wesley G Harris
(74) *Attorney, Agent, or Firm* — Xsensus LLP

(57) ABSTRACT

A control device for an engine 1 including cylinders, and configured to perform a reduced-cylinder operation by idling some of cylinders. The control device includes a hydraulic valve-stopping mechanism 14b which closes the intake and exhaust valves 41, 51 of the cylinders in response to establishment of the reduced-cylinder operation execution condition, a hydraulic variable valve timing mechanism 19 capable of changing a phase of the exhaust valve 51 of the engine 1, and an ECU 110 which controls the valve-stopping mechanism 14b and the hydraulic variable valve timing mechanism 19. In response to establishment of the reduced-cylinder operation execution condition, the ECU 110 allows the hydraulic variable valve timing mechanism 19 to execute the phase change to the exhaust valve 51, and subsequently allows the valve-stopping mechanism 14b to bring the intake and exhaust valves 41, 51 of the cylinders into closed state.

19 Claims, 9 Drawing Sheets

(51) Int. Cl.
*F01L 13/00* (2006.01)
*F02D 13/02* (2006.01)
*F02D 41/00* (2006.01)
*F02P 5/15* (2006.01)

(52) U.S. Cl.
CPC ..... *F02D 13/0219* (2013.01); *F02D 41/0002* (2013.01); *F02D 41/0087* (2013.01); *F02P 5/1512* (2013.01); *F01L 2013/001* (2013.01); *F01L 2800/08* (2013.01); *F02D 2041/0012* (2013.01)

(56) References Cited

U.S. PATENT DOCUMENTS

| | | | |
|---|---|---|---|
| 2012/0210964 A1* | 8/2012 | Barnes | F01L 1/181 123/90.39 |
| 2013/0145832 A1* | 6/2013 | Fedewa | F01L 13/0036 73/114.79 |
| 2014/0190431 A1* | 7/2014 | McCarthy, Jr. | F01L 1/18 123/90.16 |
| 2015/0053175 A1* | 2/2015 | Nishimoto | F02D 29/06 123/350 |
| 2015/0144081 A1* | 5/2015 | Haynes | F02D 13/06 123/90.11 |
| 2015/0275710 A1* | 10/2015 | Takahata | F01M 1/16 123/90.12 |
| 2015/0377151 A1 | 12/2015 | Hashimoto et al. | |

FOREIGN PATENT DOCUMENTS

| | | |
|---|---|---|
| JP | 2015-194132 A | 11/2015 |
| JP | 2015-203370 A | 11/2015 |
| JP | 2016-50510 A | 4/2016 |
| WO | 2014/156012 A1 | 10/2014 |

\* cited by examiner

CONTROL DEVICE FOR ENGINE

CROSS-REFERENCE TO RELATED APPLICATIONS

The present application is based on PCT filing PCT/JP2018/010696, filed Mar. 19, 2018, which claims priority to JP 2017-057411, filed Mar. 23, 2017, the entire contents of each are incorporated herein by reference.

TECHNICAL FIELD

The present invention relates to a control device for an engine, and more particularly, to a control device for an engine, which allows execution of a reduced-cylinder operation by stopping operating some of a plurality of cylinders.

BACKGROUND ART

Conventionally, there has been a well-known control device for an engine including a plurality of cylinders, a hydraulic valve-stopping mechanism configured to hold intake valves and exhaust valves of some of the plurality of cylinders (for example, a first and a fourth cylinders of the first to the fourth cylinders) closed, and a control unit for controlling the hydraulic valve-stopping mechanism so as to allows execution of a reduced-cylinder operation in which operations of some of the cylinders are suspended in the idle state.

The reduced-cylinder operation causes a torque shock owing to the reduced engine output as a result of decreasing the number of operating cylinders. Upon establishment of a reduced-cylinder operation execution condition as a condition for executing the reduced-cylinder operation, the generally employed control device will increase the throttle valve opening before stopping combustion in the idle cylinders to increase amount of intake air to all the cylinders, and, thereafter, stop combustion in the idle cylinders.

However, simple increase in the intake air amount to all the cylinders before stopping combustion in the idle cylinders, that is, in the switch transition stage will temporarily increase an engine output, resulting in the torque shock as well.

Patent Literature 1 discloses a control device for an engine, including the hydraulic valve-stopping mechanism configured to hold the intake valves and the exhaust valves of the idle cylinders closed. Upon establishment of the reduced-cylinder operation execution condition, the device will increase the throttle valve opening so that the intake air amount to the respective cylinders is larger than the intake air amount during normal all-cylinder operation where the reduced-cylinder operation execution condition is not established. The control device further executes a preparatory control to retard the ignition period of the ignitor so as to close the intake valve and the exhaust valve of the idle cylinder, and stop ignition in the idle cylinder after the end of the preparatory control.

Meanwhile, it is known that the engine is provided with a phase control mechanism (variable valve mechanism) capable of varying valve characteristics of the intake valve and the exhaust valve for the purpose of optimizing the operational state of the engine.

The phase control mechanism includes a hydraulic phase control mechanism driven by oil pressure as the driving source, and an electric phase control mechanism driven by an electric motor as the driving source.

In general, the hydraulic phase control mechanism is driven by the oil pressure boosted by a variable capacity oil pump rotationally driven by the crankshaft of the engine.

CITATION LIST

Patent Literature

Patent Literature 1: Japanese Patent Laid-Open No. 2016-050510

SUMMARY OF INVENTION

The control device for an engine as disclosed in Patent Literature 1 is configured to synchronize the throttle valve opening increasing timing accompanied with establishment of the reduced-cylinder operation execution condition with the timing for boosting the oil pressure of the hydraulic valve-stopping mechanism to the target oil pressure.

The follow-up property of air is higher than that of the oil pressure from the aspect of physical characteristic.

Therefore, the time period taken for boosting the hydraulic valve-stopping mechanism becomes significantly longer than the time period taken for increasing the intake amount to each cylinder to the predetermined amount. The time period for retarding the ignition period (ignition retard) will be prolonged, resulting in a risk of the fuel consumption deterioration.

The problem of the fuel consumption deterioration may be solved by starting execution of increasing the throttle valve opening while waiting until the oil pressure of the hydraulic valve-stopping mechanism reaches the target oil pressure (end of switching).

In the engine with the hydraulic phase control mechanism, high oil pressure (that is, oil pressure consumption amount) is required for operating the hydraulic phase control mechanism, which may reduce the oil pressure to be applied to the hydraulic valve-stopping mechanism, and fluctuate the oil pressure, for example, overshoot or undershoot. This may cause the risk of prolonging the time period taken until the closed states of the intake and exhaust valves are appropriately held by the hydraulic valve-stopping mechanism, leading to the prolonged time period taken for switching from the all-cylinder operation to the reduced-cylinder operation.

Especially, in the engine with the hydraulic phase control mechanism, the opening/closing timing of the exhaust valve is set to the retarding side in switching from the all-cylinder operation to the reduced-cylinder operation for increasing the torque by highly expanding the combustion gas. Meanwhile, setting the opening/closing timing of the intake valve and the exhaust valve to the retarding side may decrease the pumping loss.

If the above-described switching time period is prolonged, the effect of improving the fuel consumption derived from the hydraulic phase control mechanism is insufficient, causing a risk of making the engine torque unstable.

It is an object of the present invention to provide a control device for an engine, capable of stabilizing the engine torque while improving the fuel consumption by reducing the time period for switching from the all-cylinder operation to the reduced-cylinder operation.

Solution to Problem

In order to solve the above-described problem, a control device for an engine according to the present invention is applicable to an engine including a plurality of cylinders, and is configured to selectively execute the reduced-cylinder operation in which operations of some of the cylinders are suspended in the idle state, and the all-cylinder operation in which all the cylinders are operated. The control device includes a hydraulic valve-stopping mechanism which holds an intake valve and an exhaust valve of the idle cylinders in closed states in the reduced-cylinder operation, a hydraulic phase control mechanism which makes a phase of the intake valve or the exhaust valve of the engine variable, and a control unit which controls the hydraulic valve-stopping mechanism and the hydraulic phase control mechanism. In response to establishment of a reduced-cylinder operation execution condition as a condition for executing the reduced-cylinder operation, the control unit allows the hydraulic phase control mechanism to execute a phase change to the intake valve or the exhaust valve, and subsequently, allows the hydraulic valve-stopping mechanism to bring the intake valve and the exhaust valve of the idle cylinders to be held closed.

The control device for an engine according to the present invention is capable of stabilizing the engine torque while providing the effect of improving the fuel consumption by reducing the time period for switching from the all-cylinder operation to the reduced-cylinder operation.

BRIEF DESCRIPTION OF DRAWINGS

FIG. 3 shows a valve-stopping mechanism, wherein FIG. 3(a) shows a locked state of a pivot; FIG. 3(b) shows a state before the pivot is shifted to an unlocked state; and FIG. 3(c) shows the unlocked state of the pivot.

DESCRIPTION OF EMBODIMENT

The embodiment of the present invention will be described below referring to FIG. 1 to FIG. 11.

The following explanation will be made by exemplifying application of a control device for an engine according to the present invention to the vehicle without restricting the present invention, and any application or usage thereof (Overall Structure of Engine)

Figure 1:
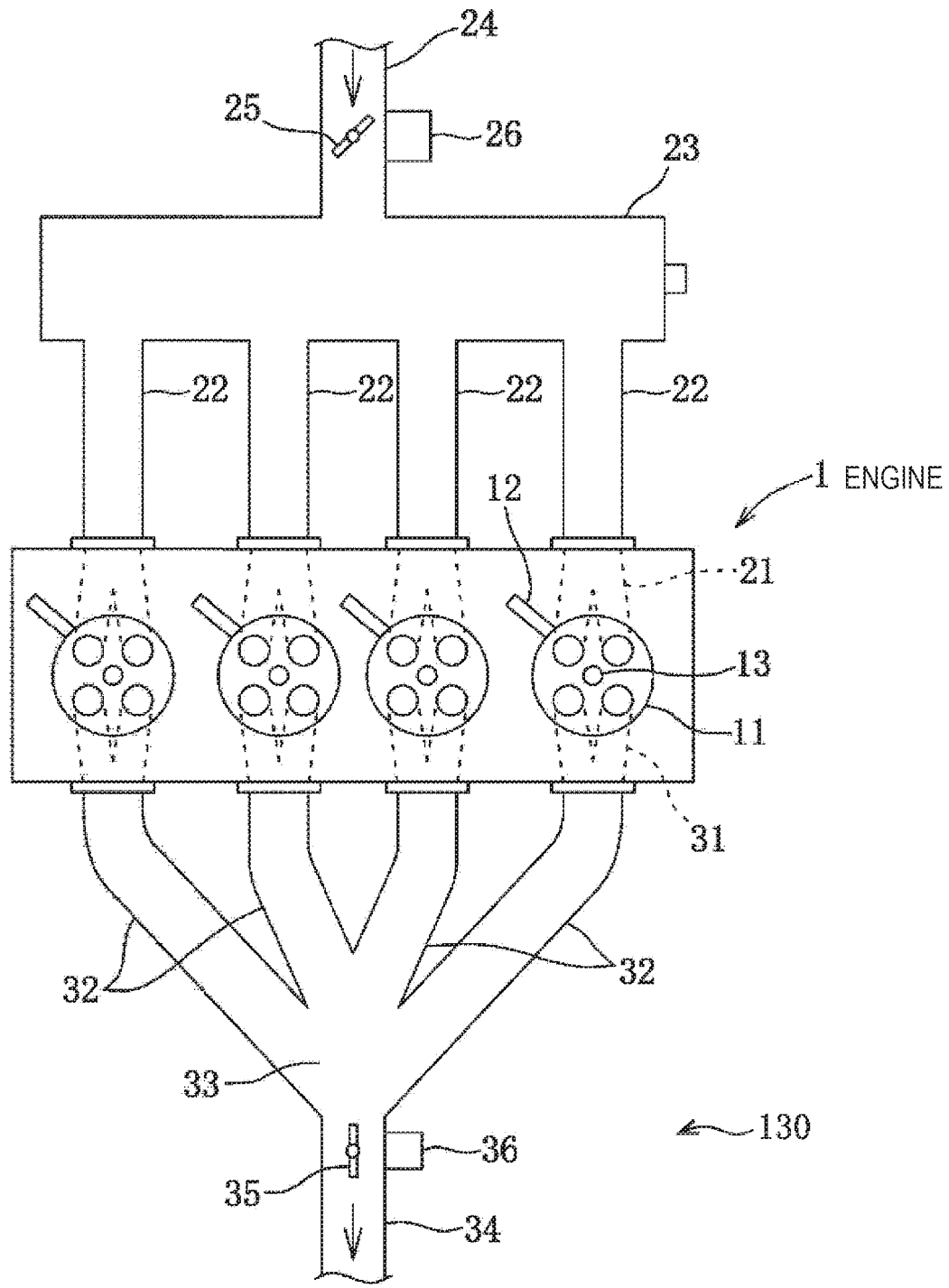
FIG. 1 is a schematic plan view showing an overall structure of an engine according to an embodiment of the present invention.
Figure 2:
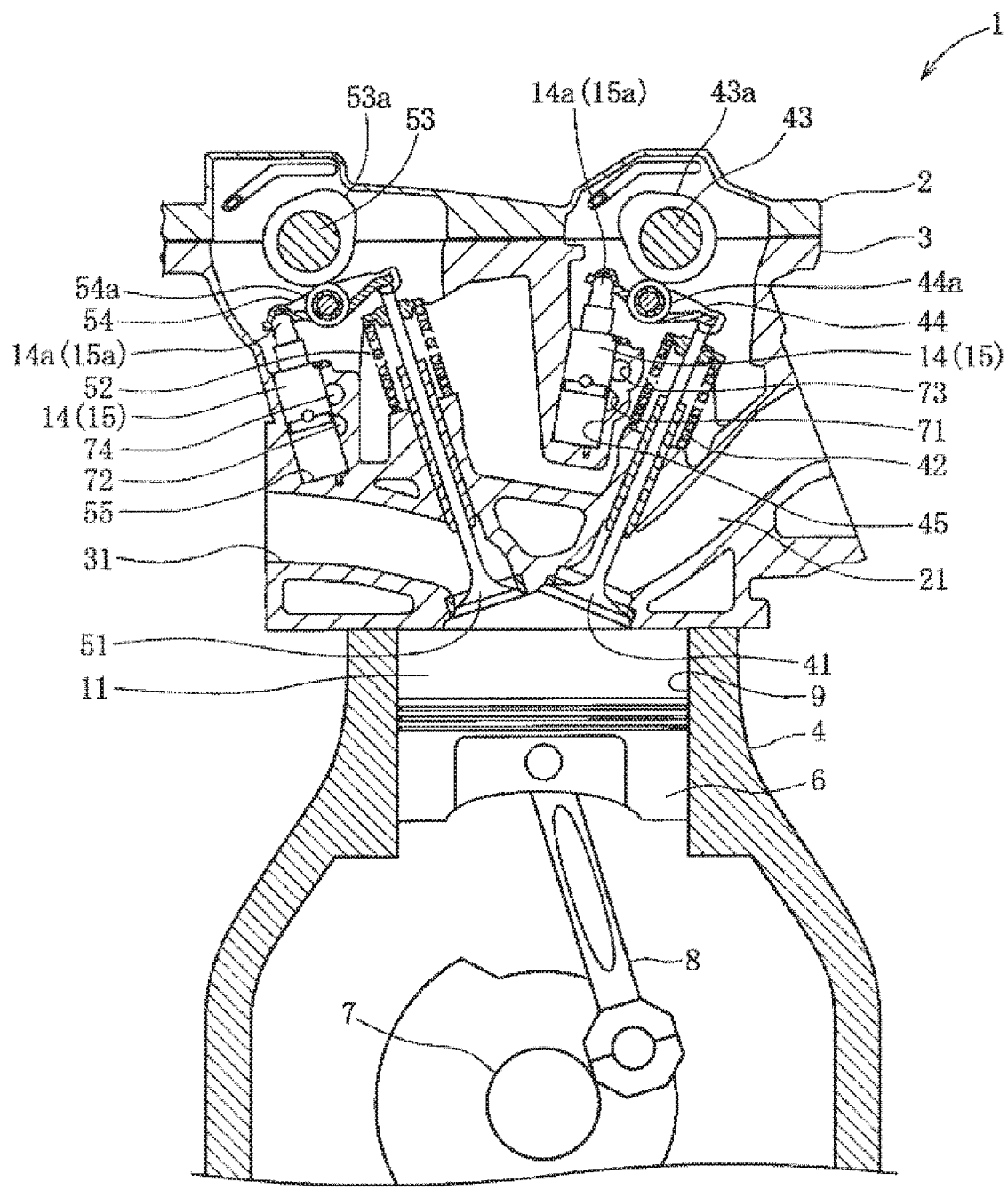
FIG. 2 is a longitudinal sectional view of the engine.
Figure 3:
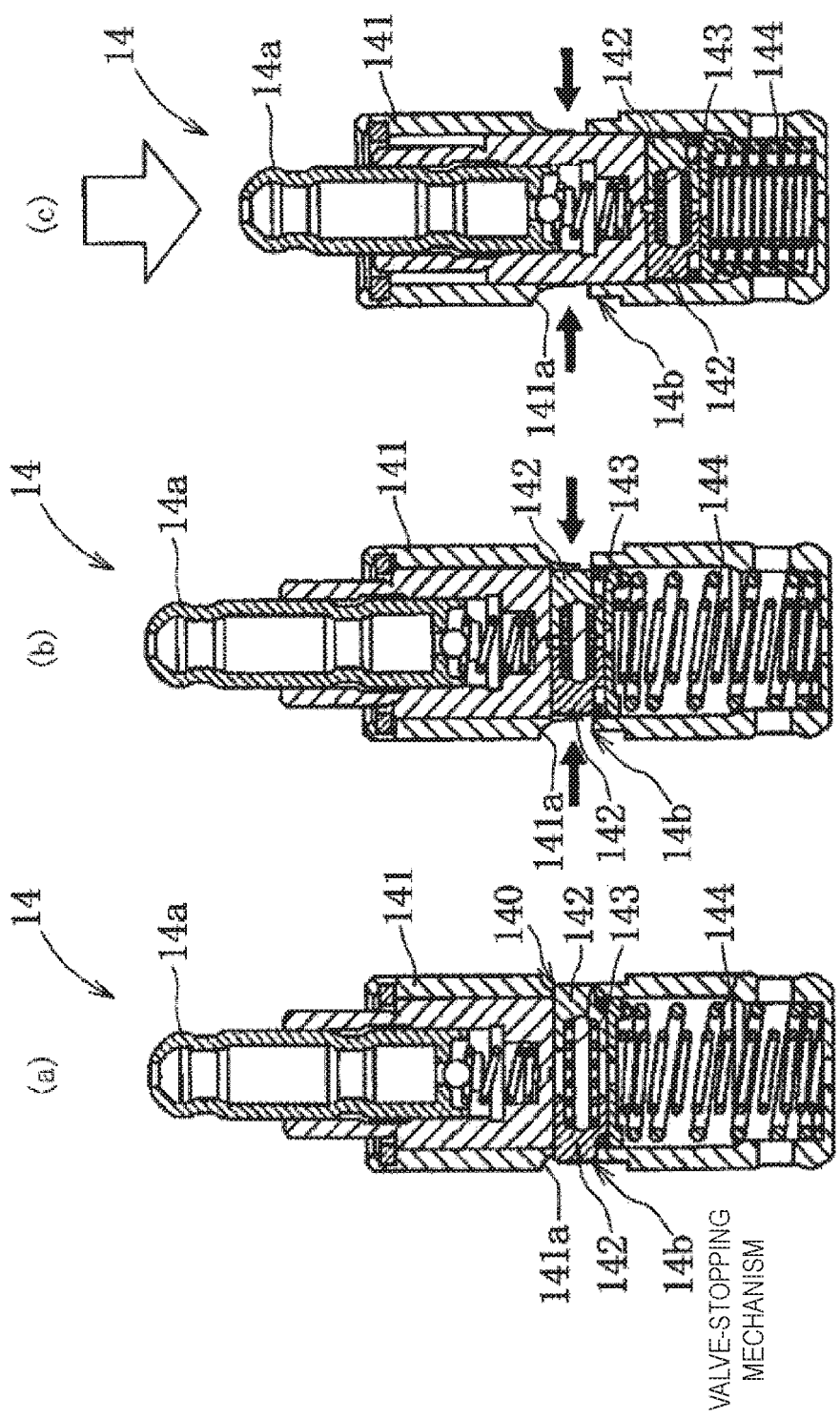

As FIG. 1 and FIG. 2 show, an engine 1 is an in-line four-cylinder gasoline engine having the first to the fourth cylinders sequentially arranged in series, for example, and mounted on a vehicle such as an automobile.

In the embodiment, the engine 1 is configured to allow execution of the reduced-cylinder operation to stop operating some (first and fourth cylinders in the embodiment) of all cylinders (four cylinders) of the engine 1, and the all-cylinder operation to operate all cylinders (four cylinders). In the following explanation, the cylinders (the first and the fourth cylinders) to be stopped in the reduced-cylinder operation (that is, combustion is stopped) will be referred to as idle cylinders as required.

The engine 1 includes a head cover 2, a cylinder head 3, a cylinder block 4, a crankcase (not shown), and an oil pan 5 (see FIG. 4), which are vertically linked.

The engine 1 includes pistons 6 slidable in four cylinder bores 9 formed in the cylinder block 4, respectively, and crankshafts 7 rotatably supported to the respective crankcases. The piston 6 and the crankshaft 7 are linked with a connecting rod 8. Each cylinder includes a combustion chamber 11 defined by the cylinder bore 9 of the cylinder block 4, the piston 6, and the cylinder head 3.

The combustion chamber 11 is provided with an injector 12 for injecting fuel into the combustion chamber 11, and a spark plug 13 for igniting an air-fuel mixture in the combustion chamber 11. In the embodiment, the ignition is performed in the cylinders in the order of the first cylinder, the third cylinder, the fourth cylinder, and the second cylinder.

The engine 1 includes intake system elements, that is, intake ports 21 communicated with the respective combustion chambers 11, independent intake passages 22 communicated with the respective intake ports 21, a surge tank 23 as a common element connected to those independent intake passages 22, an intake pipe 24 extending from the surge tank 23 to the upstream side, and the like. Each of the combustion chambers 11 (respective cylinders) receives air introduced through an air duct (not shown), the intake pipe 24, the surge tank 23, the independent intake passage 22, and the intake port 21. A butterfly type throttle valve 25 (air amount adjustment unit) capable of adjusting the amount of air introduced into the respective cylinders is installed in the middle part of the intake pipe 24. An actuator 26 (electric motor) for driving the throttle valve 25 is disposed at the position near the throttle valve 25. In the embodiment, the downstream section of the independent intake passage 22 serves as an intake manifold which allows flow of the intake air to be introduced into the respective cylinders.

The engine 1 includes an exhaust passage 130 through which exhaust gas exhausted from the respective cylinders flows. The exhaust passage 130 includes exhaust ports 31 communicated with the respective combustion chambers 11, independent exhaust passages 32 communicated with the respective exhaust ports 31, a junction 33 where those independent exhaust passages 32 join, an exhaust pipe 34 extending from the junction 33 to the downstream side, and the like. A butterfly type exhaust shutter valve 35 capable of adjusting the amount of exhaust gas flowing through the exhaust pipe 34 is installed in the middle part of the exhaust pipe 34. When the exhaust shutter valve 35 is brought into a closing side, the amount of the exhaust gas flowing through the exhaust pipe 34 (exhaust passage 130) is reduced. An actuator 36 (electric motor) for driving the exhaust shutter valve 35 is disposed at the position near the exhaust shutter valve 35.

As FIG. 2 shows, the intake port 21 and the exhaust port 31 are provided with an intake valve 41 and an exhaust valve 51, respectively to open and close those ports.

Phases or valve opening/closing timings of the intake valve 41 and the exhaust valve 51 are changed by an intake variable valve timing mechanism 19 and an exhaust variable valve timing mechanism 20, respectively. In the embodiment, those valve timing mechanisms 19, 20 change the opening/closing timings of the intake valve 41 and the exhaust valve 51 while keeping the duration of the opening constant. In the embodiment, the intake variable valve timing mechanism 19 for changing the phase of the intake valve 41 is electrically operated. Meanwhile, the exhaust variable valve timing mechanism 20 for changing the phase of the exhaust valve 51 is hydraulically operated. In the drawing, the variable valve timing mechanism is expressed as S-VT.

Return springs 42, 52 urge the intake valve 41 and the exhaust valve 51 in the valve closing direction (upward). Cam portions 43a, 53a which are disposed around outer peripheries of rotating camshafts 43, 53 press down cam followers 44a, 54a which are rotatably disposed at substantially center of swing arms 44, 54, respectively.

Each of the swing arms 44, 54 swings with respect to each top portion of pivot mechanisms 14a, 15a attached to one end side of those swing arms as fulcrums, respectively. Each of the intake valve 41 and the exhaust valve 51 is connected to the other ends of the swing arms 44, 54. The intake valve 41 and the exhaust valve 51 are opened when the swing arms 44, 54 swing to press down the other ends thereof, the intake valve 41, and the exhaust valve 51 against the urging force of the return springs 42, 52.

The swing arms 44, 54 of the second and the third cylinders at the center in a cylinder array direction of the engine 1 include pivot mechanisms 15a each provided with a known hydraulic lash adjuster (hereinafter abbreviated to HLA) 15 configured to automatically adjust a valve clearance to zero by utilizing an oil (hydraulic fluid) pressure (hereinafter referred to as oil pressure for simplification).

Meanwhile, as FIG. 2 shows, the swing arms 44, 54 of the first and the fourth cylinders at the respective ends in the cylinder array direction of the engine 1 include pivot mechanisms 14a each provided with an HLA 14 with valve-stopping mechanism. Likewise the HLA 15, the HLA 14 with valve-stopping mechanism is configured to allow the valve clearance to be automatically adjusted to zero by utilizing the oil pressure.

In the reduced-cylinder operation, the HLA 14 stops opening/closing the intake valves 41 and the exhaust valves 51 of the first and the fourth cylinders as the idle cylinders so as to hold those valves closed. Meanwhile, in the all-cylinder operation, the HLA 14 allows opening/closing of the intake valves 41 and the exhaust valves 51 of the first and the fourth cylinders as the idle cylinders. The intake valves 41 and the exhaust valves 51 of the second and the third cylinders are operated both in the reduced-cylinder operation and the all-cylinder operation.

In this way, in the reduced-cylinder operation, the HLA 14 stops operating the intake valves 41 and the exhaust valves 51 of the first and the fourth cylinders among the first to the fourth cylinders of the engine 1, and, in the all-cylinder operation, operates the intake valves 41 and the exhaust valves 51 of the first to the fourth cylinders. The reduced-cylinder operation and the all-cylinder operation may be selectively executed in accordance with an operational state of the engine 1 to be described later.

Mount holes 45, 55 through which a lower portion of the HLA 14 is inserted and mounted are formed in sections of the cylinder head 3, which correspond to the first and the fourth cylinders at intake and exhaust sides. Mount holes (not shown) similar to the mount holes 45, 55, through which a lower portion of the HLA 15 is inserted and mounted are formed in sections of the cylinder head 3, which correspond to the second and the third cylinders at intake and exhaust sides.

A pair of oil passages 71 and 73 are formed in the mount hole 45, and a pair of oil passages 72 and 74 are formed in the mount hole 55. The oil passages 71, 72 serve to apply oil pressure to valve-stopping mechanisms 14b of the HLA 14 so as to be operated. The oil passages 73, 74 serve to apply oil pressure to the pivot mechanisms 14a so as to be operated. Only the oil passages 73, 74 are communicated with the pivot mechanisms 15a of the second and the third cylinders.

As FIG. 3(a) shows, the valve-stopping mechanism 14b includes a lock mechanism 140 which locks an operation of the pivot mechanism 14a. The pivot mechanism 14a is stored in a bottomed outer cylinder 141 slidably in an axial direction thereof. Through holes 141a are formed in a circumferential surface of the outer cylinder 141 at two radially opposite positions. The lock mechanism 140 includes a pair of retractable lock pins 142 in the respective through holes 141a. The pair of lock pins 142 are urged by a spring 143 radially outward of the outer cylinder 141. A lost motion spring 144 which urges the pivot mechanism 14a while being pressurized upward of the outer cylinder 141 is disposed between an inner bottom portion of the outer cylinder 141 and a bottom portion of the pivot mechanism 14a.

If both the lock pins 142 are engaged with the through holes 141a of the outer cylinder 141, the pivot mechanism 14a above the lock pin 142 is fixed while being in the upwardly protruding state.

The top portion of the pivot mechanism 14a serves as the fulcrum of swinging motions of the swing arms 44, 54. When the cam portions 43a, 53a press down the cam followers 44a, 54a accompanied with rotations of the camshafts 43, 53, the intake valve 41 and the exhaust valve 51 are opened while being pressed down against the urging force of the return springs 42, 52. Specifically, in the state where the lock pins 142 are engaged with the through holes 141a, the intake valve 41 and the exhaust valve 51 may be opened and closed.

Meanwhile, as bolded arrows of FIG. 3(b) and FIG. 3(c) show, if the outer ends of the lock pins 142 are pressed under oil pressure, the lock pins 142 retract radially inward of the outer cylinder 141 so that the lock pins 142 are moved in a mutually approaching direction against the urging force of the spring 143.

As a result, the lock pins 142 are disengaged from the through holes 141a so that the pivot mechanism 14a above the lock pin 142 becomes movable downward in the axial direction of the outer cylinder 141.

Each urging force of the return springs 42, 52 is higher than the urging force of the lost motion spring 144. In the state where the lock pins 142 are disengaged from the through holes 141a, as the cam portions 43a, 53a press down the cam followers 44a, 54a accompanied with rotations of the camshafts 43, 53, each top end of the intake valve 41 and the exhaust valve 51 serves as the fulcrum of swinging motions of the swing arms 44, 54. As a result, the pivot mechanism 14a is pressed down against the urging force of the lost motion spring 144 while holding the intake valve 41 and the exhaust valve 51 closed. As described above, the intake valve 41 and the exhaust valve 51 are held closed by disengaging the lock pins 142 from the through holes 141a.

(Oil Supply Circuit)

Figure 4:
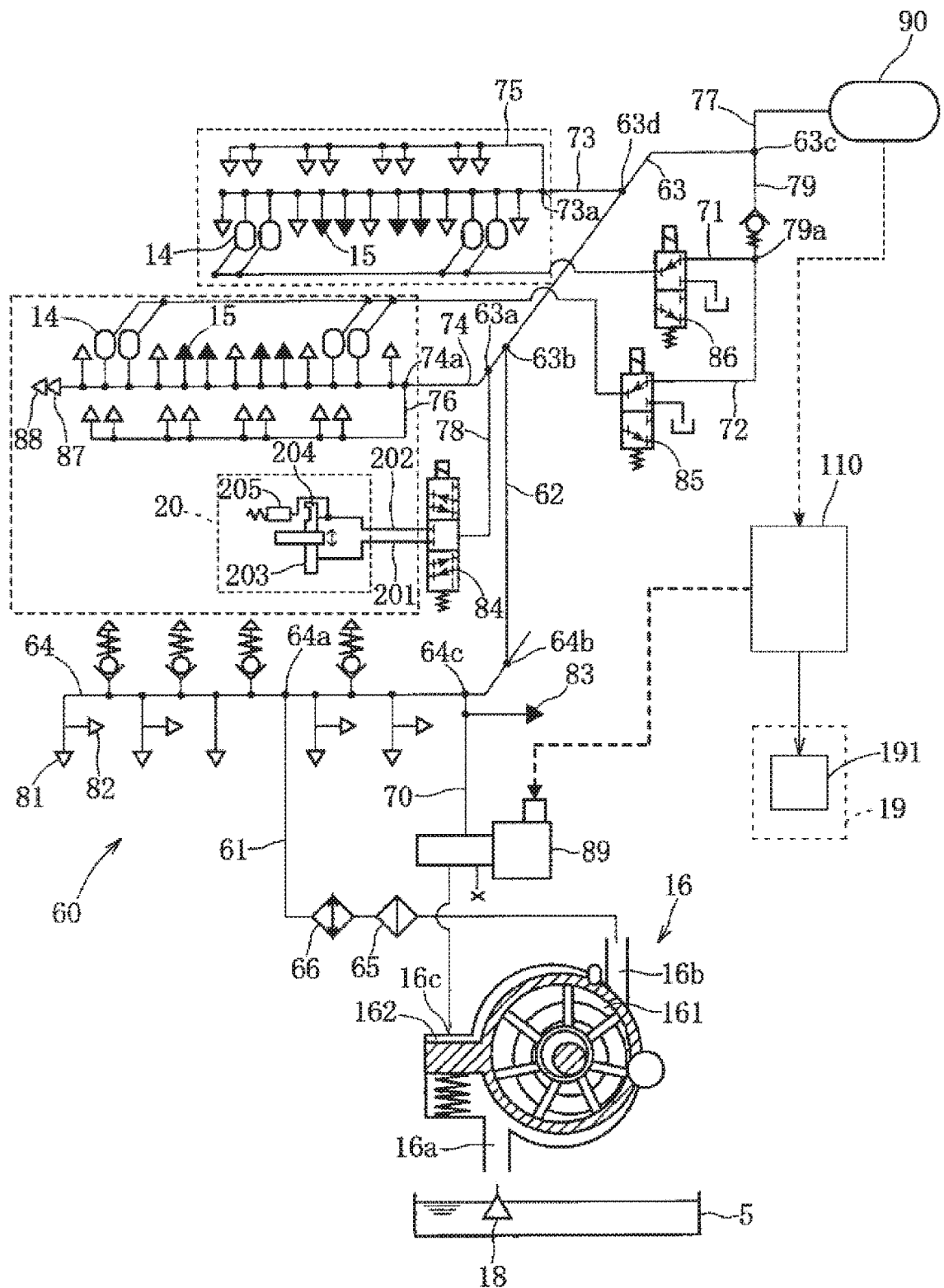
FIG. 4 is a schematic view showing a structure of an oil supply device.

As FIG. 4 shows, an oil supply circuit includes a variable capacity oil pump 16 driven by rotation of the crankshaft 7, and an oil feed passage 60 connected to the oil pump 16. The oil feed passage 60 serves to guide the oil boosted by the oil pump 16 to the respective lubrication units and the respective hydraulic actuation devices of the engine 1.

The oil feed passage 60 is an oil passage formed in the cylinder head 3 and the cylinder block 4. The oil feed passage 60 includes first to third communication passages 61 to 63, a main gallery 64, and a plurality of oil passages 71 to 79.

The first communication passage 61 communicated with the oil pump 16 extends from its outlet 16b to a branch point 64a in the cylinder block 4.

The main gallery 64 extends in the cylinder block 4 in the cylinder array direction.

The second communication passage 62 extends from a branch point 64b on the main gallery 64 to a branch point 63b on the cylinder head 3. The third communication passage 63 extends substantially horizontally in the cylinder head 3 between the intake side and the exhaust side. The plurality of oil passages 71 to 79 are branched from the third communication passage 63 in the cylinder head 3.

The oil pump 16 is a known variable capacity oil pump which changes an exhaust amount of the oil from the oil pump 16 accompanied with change in the capacity of the oil pump 16. The oil pump 16 includes a housing, a drive shaft, a pump element, a cam ring, a spring, a ring member and the like.

The housing of the oil pump 16 includes a pump chamber 161 formed therein, an inlet 16a for supplying the oil to the pump chamber 161, and the outlet 16b for discharging the oil from the pump chamber 161.

A pressure chamber 162 is defined by an inner peripheral surface of the housing and an outer circumferential surface of the cam ring in the housing of the oil pump 16. The pressure chamber 162 includes an introduction hole 16c.

An oil strainer 18 which faces the oil pan 5 is attached to the inlet 16a of the oil pump 16. An oil filter 65 and an oil cooler 66 are disposed in the first communication passage 61 communicated with the outlet 16b of the oil pump 16 from the upstream side to the downstream side.

The oil stored in the oil pan 5 is drawn up by the oil pump 16 via the oil strainer 18, and filtered by the oil filter 65. The oil is then cooled by the oil cooler 66 so as to be introduced into the main gallery 64 inside the cylinder block 4.

The main gallery 64 is connected to oil supply units 81 for metal bearings arranged on five main journals which rotatably support the crankshaft 7, and oil supply units 82 for metal bearings arranged on the crank pins of the crankshaft 7 rotatably linked to four connecting rods 8. The oil is constantly supplied to the main gallery 64.

The main gallery 64 is connected to an oil supply unit 83 for supplying oil to a hydraulic chain tensioner (not shown) of the timing chain (not shown), and an oil passage 70 for supplying oil to the pressure chamber 162 of the oil pump 16 at the downstream side of a branch point 64c. The oil passage 70 communicates the branch point 64c of the main gallery 64 and the introduction hole 16c of the oil pump 16. A linear solenoid valve 89 capable of electrically executing duty control of an oil flow rate is disposed in the middle part of the oil passage 70.

The oil passage 78 branched from the branch point 63a of the third communication passage 63 is connected to an exhaust-side first direction switch valve 84 through which the oil passage 78 is connected to an advancing side oil passage 201 and a retarding side oil passage 202. Oil is supplied to an advancing operation chamber 203 of the exhaust variable valve timing mechanism 20 to be described later via the advancing side oil passage 201. Meanwhile, oil is supplied to a retarding operation chamber 204 of the exhaust variable valve timing mechanism 20 to be described later via the retarding side oil passage 202.

The oil passage 74 branched from the branch point 63a is connected to the oil supply unit (see void triangle A of FIG. 4), the HLA 15, the HLA 14, a fuel pump 87, and a vacuum pump 88.

The oil passage 76 branched from a branch point 74a of the oil passage 74 is connected to an oil shower for supplying lubricating oil to the exhaust-side swing arm 54 so that oil is constantly supplied to the oil passage 76.

The oil passage 77 branched from the branch point 63c of the third communication passage 63 is provided with an oil pressure sensor 90 for detecting oil pressure of the oil passage 77. The oil passage 73 branched from the branch point 63d is connected to the oil supply unit (see void triangle A of FIG. 4) on the cam journal of the intake-side camshaft 43, the HLA 15, and the HLA 14. The oil passage 75 branched from the branch point 73a of the oil passage 73 is connected to the oil shower for supplying the lubricating oil to the intake-side swing arm 44.

The oil passage 79 branched from the branch point 63c of the third communication passage 63 is provided with a check valve for regulating the oil flow only to one direction from the upstream side to the downstream side. The oil passage 79 is branched into the two oil passages 71, 72 from a branch point 79a at the downstream side of the check valve. As described above, those oil passages 71, 72 are communicated with the mount holes 45, 55 for the HLA 14 with valve-stopping mechanism, and connected to the valve-stopping mechanisms 14b of the HLAs 14 with a mechanism for stopping valves at the intake side and the exhaust side, respectively via the hydraulic control valves, that is, an intake-side second direction switch valve 86 and an exhaust-side second direction switch valve 85. Those intake-side second direction switch valve 86 and the exhaust-side second direction switch valve 85 change the state of the oil supplied to the respective valve-stopping mechanisms 14b.

(Phase Control Mechanism)

Cam pulleys of the intake variable valve timing mechanism 19 and the exhaust variable valve timing mechanism 20 are driven by a sprocket (not shown) of the crankshaft via the timing chain.

(Intake Variable Valve Timing Mechanism)

As FIG. 4 shows, the intake variable valve timing mechanism 19 includes an electric motor 191 and a conversion unit (not shown) formed at one end of the camshaft 43.

A gear pulley which rotates synchronously with the crankshaft 7 is engaged with the timing chain. The electric motor 191 is integrated with the gear pulley, and the conversion unit is integrated with the camshaft 43.

Displacement of the conversion unit relative to the electric motor 191 around its axial center changes phases between the gear pulley (timing chain) and the camshaft 43 to change the phase of the intake valve 41.

(Exhaust Variable Valve Timing Mechanism)

The exhaust variable valve timing mechanism 20 includes an annular housing, and a vane body stored in the housing (both not shown). The housing of the exhaust variable valve timing mechanism 20 is rotatably and integrally linked to the cam pulley which rotates synchronously with the crankshaft 7 while rotating interlocked therewith. The vane body of the exhaust variable valve timing mechanism 20 is rotatably and integrally linked to the camshaft 53 for opening and closing the exhaust valve 51 with a fastening bolt.

In the housing of the exhaust variable valve timing mechanism 20, a plurality of advancing operation chambers 203 and retarding operation chambers 204 are defined by a plurality of vanes formed on an outer peripheral surface of the vane body and an inner peripheral surface of the housing.

As FIG. 4 shows, the advancing operation chamber 203 and the retarding operation chamber 204 are connected to the exhaust-side first direction switch valve 84 via the advancing side oil passage 201 and the retarding side oil passage 202, respectively, as described above. The exhaust-side first direction switch valve 84 is connected to the variable capacity oil pump 16. Each part of the advancing side oil passage 201 and the retarding side oil passage 202 is partially formed on the camshaft 53 and the vane body of the exhaust variable valve timing mechanism 20, respectively.

As FIG. 4 shows, the exhaust variable valve timing mechanism 20 includes the lock mechanism which locks the operation of the exhaust variable valve timing mechanism 20. The lock mechanism includes a lock pin 205 for fixing a phase angle of the camshaft 53 with respect to the crankshaft 7 to a specific phase.

Oil supplied through the advancing side oil passage 201 allows each vane to rotate to an advanced position with respect to the cam pulley (crankshaft 7). Oil supplied through the retarding side oil passage 202 allows each vane to rotate to a retarded position with respect to the cam pulley. The lock pin 205 urged by an urging spring is engaged with an engagement recess formed in a part of the vane body, on which no vane is formed, and brought into the locked state. The vane body is fixed to the housing so that the phase of the camshaft 53 with respect to the crankshaft 7 is fixed.

The exhaust-side first direction switch valve 84 is capable of changing each amount of oil supplied to the advancing side oil passage 201 and the advancing operation chamber 203 of the exhaust variable valve timing mechanism 20, and each amount of oil supplied to the retarding side oil passage 202 and the retarding operation chamber 204 of the exhaust variable valve timing mechanism 20. The exhaust-side first direction switch valve 84 changes the opening/closing timing of the exhaust valve 51.

Specifically, if the amount of oil supplied to the advancing operation chamber 203 via the exhaust-side first direction switch valve 84 is more than the amount of oil supplied to the retarding operation chamber 204 (oil pressure applied to the advancing operation chamber 203 is higher than the oil pressure applied to the retarding operation chamber 204), the camshaft 53 rotates in the corresponding rotating direction to advance the opening/closing timing of the exhaust valve 51 to the earlier (advancing side) timing.

Meanwhile, if the amount of oil supplied to the retarding operation chamber 204 via the exhaust-side first direction switch valve 84 is larger than the amount of oil supplied to the advancing operation chamber 203 (oil pressure applied to the retarding operation chamber 204 is higher than the oil pressure applied to the advancing operation chamber 203), the camshaft 53 rotates reversely to retard the opening timing of the exhaust valve 51 to the later (retarding side) timing.

(Control System)

The engine 1 is controlled by an ECU (Electric Control Unit) 110.

The ECU 110 executes the all-cylinder operation for operating the first to the fourth cylinders upon establishment of an all-cylinder operation execution condition, and executes the reduced-cylinder operation for operating only the second and the third cylinders by stopping operations of the first and the fourth cylinders as the idle cylinders upon establishment of the reduced-cylinder operation execution condition.

The ECU 110 includes a CPU (Central Processing Unit), a ROM, a RAM, an input-side interface, and an output-side interface.

Figure 5:
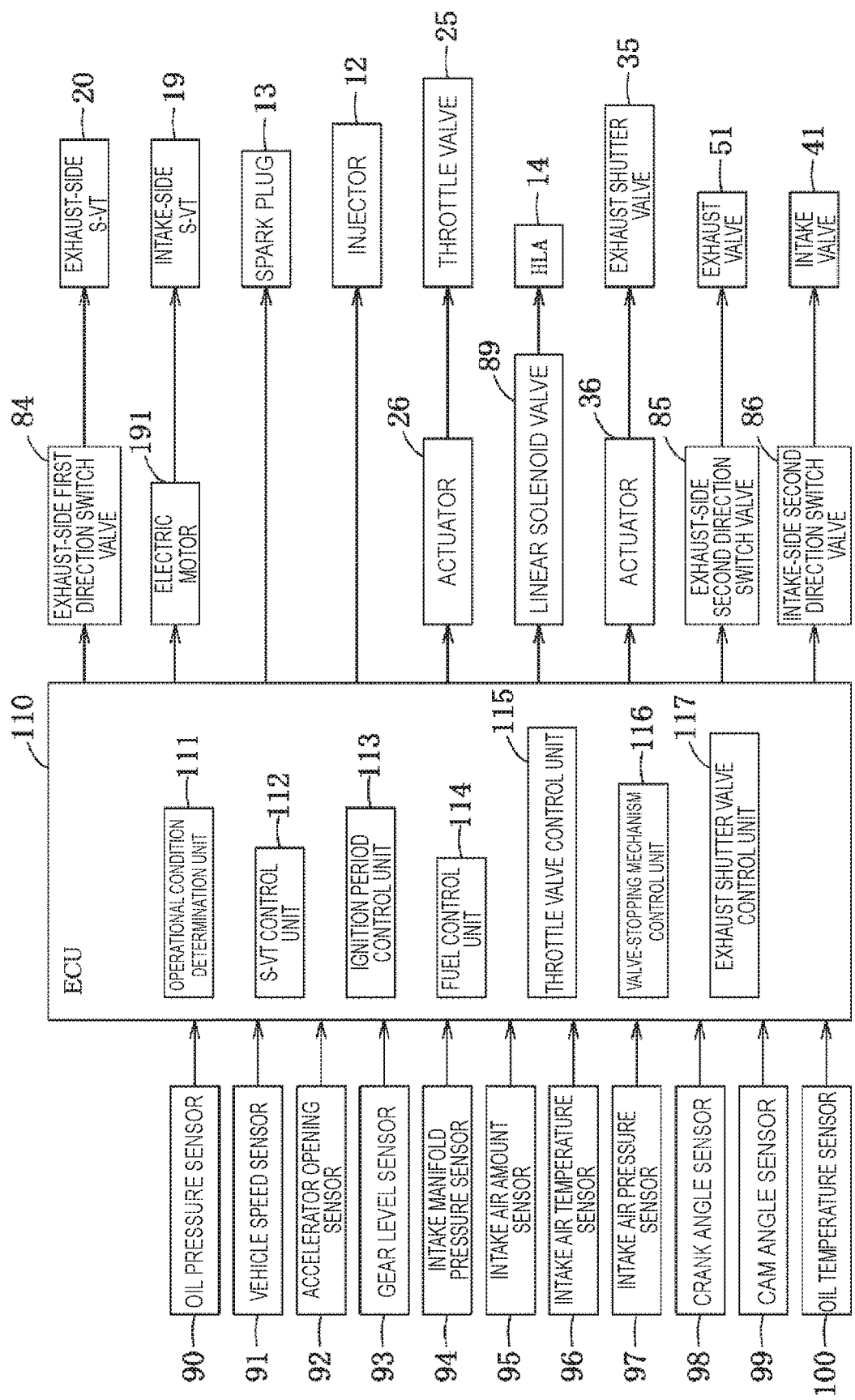
FIG. 5 is a block diagram showing an engine control system.

As FIG. 5 shows, the ECU 110 is electrically connected to the oil pressure sensor 90, a vehicle speed sensor 91, an accelerator opening sensor 92, a gear stage sensor 93, an intake manifold pressure sensor 94, an intake air amount sensor 95, an intake air temperature sensor 96, an intake air pressure sensor 97, a crank angle sensor 98, a cam angle sensor 99, an oil temperature sensor 100, and the like.

The vehicle speed sensor 91 detects the vehicle traveling speed. The accelerator opening sensor 92 detects a stepped-down amount of an accelerator pedal (not shown) stepped by the driver. The gear stage sensor 93 detects a currently set gear stage of the transmission mounted on the vehicle. The intake manifold pressure sensor 94 detects the pressure in the intake manifold (intake manifold pressure). The intake air amount sensor 95 detects an amount of intake air to the respective combustion chambers 11. The intake air temperature sensor 96 detects a temperature of intake air to the respective combustion chambers. The intake air pressure sensor 97 detects a pressure of intake air to the respective combustion chambers. The crank angle sensor 98 detects a rotating angle of the crankshaft 7, based on which the engine speed is detected. The cam angle sensor 99 detects each rotation angle of the camshafts 43, 53, based on which each rotation phase of the camshafts 43, 53, and each phase angle of the respective variable valve timing mechanisms 19, 20 are detected. The oil temperature sensor 100 detects a temperature of oil flowing in the oil passage 70.

Detection values of those sensors 90 to 100 are output to the ECU 110 so as to control operations of the engine 1 by the ECU 110.

Upon switching between the all-cylinder operation and the reduced-cylinder operation, the ECU 110 executes cooperation control of the injector 12, the spark plug 13, the HLA 14, the variable valve timing mechanisms 19, 20, the throttle valve 25, and the exhaust shutter valve 35 time-sequentially based on the detection values of the sensors 90 to 100 so that the total torque (required torque) output from the engine 1 becomes substantially constant.

As FIG. 5 shows, the ECU 110 includes an operational condition determination unit 111, a variable valve timing mechanism control unit 112, an ignition period control unit 113, a fuel control unit 114, a throttle valve control unit 115, a valve-stopping mechanism control unit 116, an exhaust shutter valve control unit 117, and the like.

(Operational Condition Determination Unit)

The operational condition determination unit 111 will be described.

The operational condition determination unit 111 determines selective execution of either the all-cylinder operation or the reduced-cylinder operation based on the operational state.

Figure 6:
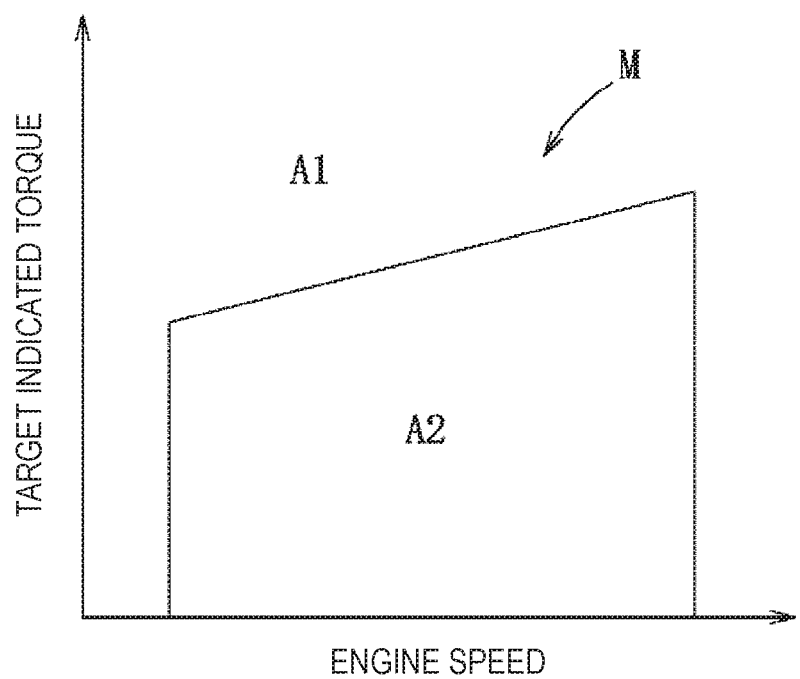
FIG. 6 is a map showing an all-cylinder operation region and a reduced-cylinder operation region.
Figure 7:
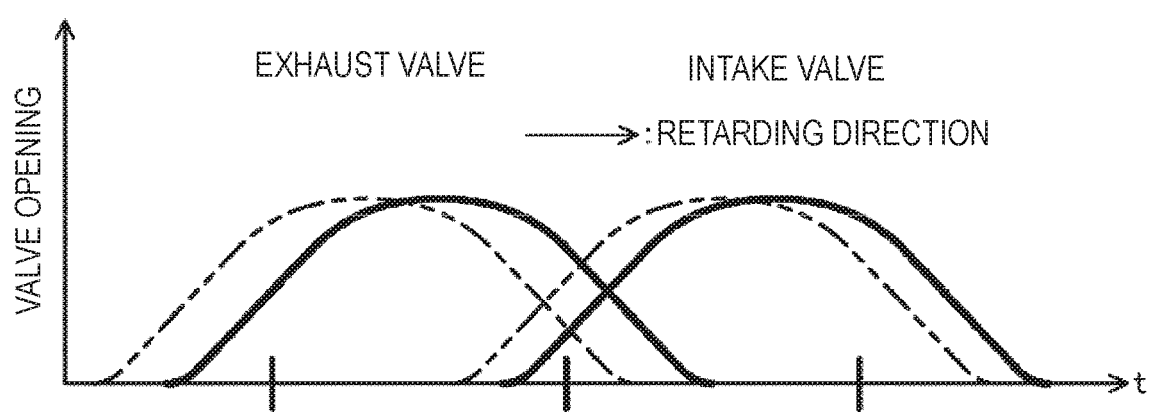
FIG. 7 is a diagram showing valve timings of an intake valve and an exhaust valve in the reduced-cylinder operation.

As FIG. 6 shows, the operational condition determination unit 111 preliminarily stores a map M for setting an all-cylinder operation region A1 where the all-cylinder operation is executed, and a reduced-cylinder operation region A2 where the reduced-cylinder operation is executed. Based on the map M and the operational state of the engine, the operational condition determination unit 111 determines the region either A1 or A2 where the engine has been operated.

When the engine has been operated in the all-cylinder operation region A1, the operational condition determination unit 111 determines that the condition for executing the all-cylinder operation is established (condition for switching from the reduced-cylinder operation to the all-cylinder operation is established). The condition for executing the all-cylinder operation will be referred to as the all-cylinder operation execution condition. When the engine has been operated in the reduced-cylinder operation region A2, the operational condition determination unit 111 determines that the condition for executing the reduced-cylinder operation is established (condition for switching from the all-cylinder operation to the reduced-cylinder operation is established). The condition for executing the reduced-cylinder operation will be referred to as the reduced-cylinder operation execution condition.

The reduced-cylinder operation region A2 covers a range from a low engine speed to a high engine speed. The upper limit torque line formed by connecting values of the highest engine torque of the respective engine speeds in the reduced-cylinder operation region A1 is set to the line which allows the engine torque to become higher as the engine speed is raised to be higher. The range of the reduced-cylinder operation region A2 is set based on the break-even torque, intake air pulsation limitation, and the like.

The x-axis and y-axis of the map M represent the engine speed and a target indicated torque, respectively.

The target indicated torque represents a basic torque as a basic value of the engine torque, which is arithmetically obtained based on the target acceleration of the vehicle. Based on the basic torque, output of the engine 1, and a gear stage control of the transmission are executed. Specifically, the target acceleration of the vehicle is set from the stepped-down amount of the accelerator pedal, the vehicle speed, and the gear stage using the preliminarily set map (not shown). The wheel torque is arithmetically obtained based on the target acceleration.

Based on the wheel torque, and output/input torques of the transmission, an axial torque required for the engine 1 is obtained. Thereafter, a correction torque, for example, an auxiliary loss or a mechanical loss is added to the axial torque of the engine to finally obtain the target indicated torque.

The ECU 110 executes a preparatory stroke without executing the reduced-cylinder operation by stopping the first and the fourth cylinders immediately after the determination made by the operational condition determination unit 111 that the reduced-cylinder operation execution condition is established. After execution of the preparatory stroke, the first and the fourth cylinders are stopped to start the reduced-cylinder operation.

Meanwhile, the ECU 110 resumes operation of the first and the fourth cylinders immediately upon the determination made by the operational condition determination unit 111 that the all-cylinder operation execution condition is established.

(Summary of Preparatory Stroke)

In the reduced-cylinder operation, the intake valves 41 and the exhaust valves 51 of the first and the fourth cylinders are held closed. In the reduced-cylinder operation, phases of the variable valve timing mechanisms 19, 20, that is, phases of the intake valve 41 and the exhaust valve 51 are set to the retarding side behind those of the all-cylinder operation. The opening of the throttle valve 25 is made larger (brought into the opening side) than the one in the case of the all-cylinder operation. In the reduced-cylinder operation, each phase of the intake valve 41 and the exhaust valve 51 is retarded in order to increase the torque by highly expanding the combustion gas, and to reduce the pumping loss.

Correspondingly, in the preparatory stroke, the oil pressure of the oil passage 70 is boosted up to the target oil pressure for switching so that the intake valves 41 and the exhaust valves 51 of the first and the fourth cylinders are held closed. The target oil pressure for switching allows the oil pressure supplied to the HLAs 14 (the valve-stopping mechanisms 14b) of the first and the fourth cylinders to be higher than the oil pressure (holding oil pressure) under which the HLAs 14 (the valve-stopping mechanisms 14b) can hold closed states of the intake valves 41 and the exhaust valves 51 of the first and the fourth cylinders.

In the preparatory stroke, phases of the intake valve 41 and the exhaust valve 51 are changed to those on the retarding side.

In the preparatory stroke, the opening of the throttle valve 25 is increased to execute an air amount increasing control for increasing the amount of intake air to be introduced to the respective combustion chambers 11 (increasing the air amount of each cylinder).

In the preparatory stroke, under the air amount increasing control, the ignition period is retarded behind the basic ignition period to be described later.

Retarding the phase of the exhaust valve 51 performed by the exhaust variable valve timing mechanism 20 results in large consumption of oil pressure. If the exhaust valve 51 is retarded in the above-described state, there may cause the risk of reducing the oil pressure to be supplied to the HLA 14, or fluctuating the oil pressure, for example, overshoot, undershoot and the like. Consequently, this may cause the risk of prolonging the time period elapsing until the HLA 14 holds the exhaust valve 51 of the idle cylinder closed. The embodiment is configured to raise the oil pressure of the oil passage 70, and accordingly, the oil pressure to be supplied to the HLA 14 after the end of retarding the phase of the exhaust valve 51 by the exhaust variable valve timing mechanism 20 so that the above-described time period is reduced.

For the purpose of reducing a duration of the ignition period retard control to suppress deterioration of fuel consumption, the embodiment is configured to execute the air amount increasing control and the ignition period retard control after retarding the phase of the exhaust valve 51 by the exhaust variable valve timing mechanism 20, and raising the oil pressure of the oil passage 70, and accordingly, the oil pressure to be supplied to the HLAs 14 of the first and the fourth cylinders. The embodiment may be configured to further execute a correction control for correcting the phase of the exhaust valve 51 by the exhaust variable valve timing mechanism 20 after raising the oil pressure as described below. In this case, the air amount increasing control and the ignition period retard control will be executed after the end of the correction control.

Upon determination of the operational condition determination unit 111 that the reduced-cylinder operation execution condition is established, the ECU 110 allows the exhaust variable valve timing mechanism 20 to start retarding the phase of the exhaust valve 51.

(Variable Valve Timing Mechanism Control Unit)

The variable valve timing mechanism control unit 112 sets target phases as target values of the phases of the intake valve 41 and the exhaust valve 51 based on each air filling efficiency (Ce) of the cylinders. The variable valve timing mechanism control unit 112 sends a command to the electric motor 191 and the exhaust-side first direction switch valve 84 to achieve the target phases.

In the embodiment, the variable valve timing mechanism control unit 112 preliminarily stores a control map (not shown) in which a relation between the air filling efficiency and the target phase is set. The variable valve timing mechanism control unit 112 extracts the target phase corresponding to the current air filling efficiency from the map.

The current air filling efficiency is calculated in the following process.

Figure 9:
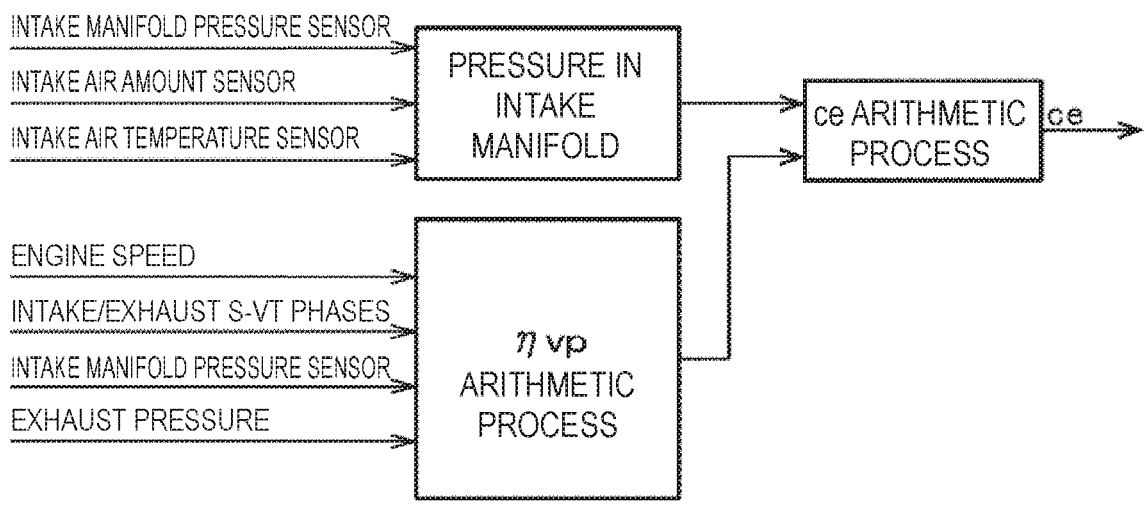
FIG. 9 is an explanatory view showing an arithmetic operation of an air filling efficiency.

As FIG. 9 shows, the intake manifold pressure is arithmetically obtained based on a detection value of the intake manifold pressure sensor 94, the intake amount detected by the intake air amount sensor 95, and the intake air temperature detected by the intake air temperature sensor 96. Alternatively or under the predetermined operational condition, it is also possible to use the detection value of the intake manifold pressure sensor 94 directly as the intake manifold pressure.

A volumetric efficiency ηvp in the intake manifold is arithmetically obtained based on the engine speed, the respective phases of the intake valve 41 and the exhaust valve 51, the intake manifold pressure, and the exhaust pressure. Each air filling efficiency of the respective cylinders is calculated using the intake manifold pressure and the volumetric efficiency ηvp.

The exhaust pressure representing the pressure in the exhaust passage 130 is estimated based on an amount of exhaust gas flowing through the exhaust passage 130 (estimated from the intake air amount, the engine speed and the like), and an opening of the exhaust shutter valve 35.

As described above, each phase of the intake valve 41 and the exhaust valve 51 in the reduced-cylinder operation is set to the retarding side behind the phase in the all-cylinder operation. Subsequently, in the preparatory stroke, the variable valve timing mechanism control unit 112 gradually retards (see FIG. 7) each phase of the intake valve 41 and the exhaust valve 51 toward the target phase for the reduced-cylinder operation on the retarding side behind the phase for the all-cylinder operation (referred to as the target phase for switching to the reduced-cylinder operation, or suitably referred to as the target phase for the reduced-cylinder operation).

In the preparatory stroke, as described above, the exhaust variable valve timing mechanism 20 changes the phases of the intake valve 41 and the exhaust valve 51. Then the oil pressure of the oil passage 70 is boosted toward the target oil pressure for switching. In the above-described state, the operational state of the engine may vary during boosting of the oil pressure of the oil passage 70. The embodiment is configured to execute the correction control which allows the exhaust variable valve timing mechanism 20 to correct the phase of the exhaust valve 51 to the correction target phase for the reduced-cylinder operation (the target phase in the newly executed reduced-cylinder operation, final target phase) as the target phase corresponding to the current air filling efficiency after boosting the oil pressure of the oil passage 70 to the target oil pressure for switching, and before execution of the air amount increasing control in the preparatory stroke. The amount of change in the phase of the exhaust valve 51 as a result of executing the correction control is smaller than the amount of change in the phase of the exhaust valve in the previous cycle (amount of change in the phase toward the target phase for the reduced-cylinder operation), resulting in minor fluctuation of the oil pressure of the oil passage 70.

If the operational state of the engine is not changed during boosting of the oil pressure of the oil passage 70 toward the target oil pressure for switching, execution of the above-described correction control is omitted.

Meanwhile, the intake variable valve timing mechanism 19 is driven by the electric motor 191. Therefore, change in the phase of the intake valve 41 performed by the intake variable valve timing mechanism 19, and the boosting operation of the oil pressure of the oil passage 70 are not mutually influenced. In the embodiment, in the preparatory stroke, the intake variable valve timing mechanism 19 changes the phase of the intake valve 41 to achieve the target phase even in the boosting operation of the oil pressure of the oil passage 70.

Figure 8:
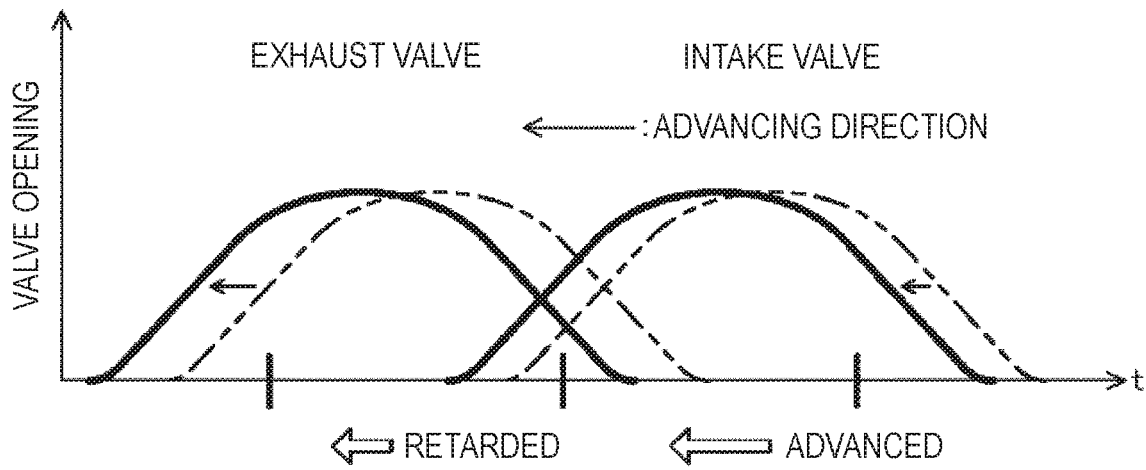
FIG. 8 is a diagram showing valve timings of the intake valve and the exhaust valve in a transitional state from the reduced-cylinder operation to the all-cylinder operation.

As FIG. 8 shows, when advancing the respective phases of the intake and exhaust valves 41, 51, an advancing operation speed of the exhaust valve 51 may be made lower than that of the intake valve 41 so as to secure an overlap between the intake and exhaust valves 41, 51 by a certain amount in the transitional state. In this case, each operation speed of the intake and exhaust valves 41, 51 is adjusted based on the oil pressure and the oil temperature.

Meanwhile, upon establishment of the all-cylinder operation execution condition, the variable valve timing mechanism control unit 112 gradually advances the respective phases of the intake valve 41 and the exhaust valve 51 from the target phase for the reduced-cylinder operation to the target phase for the all-cylinder operation on a more advancing side (see FIG. 8). The advancing control is started almost immediately after establishment of the all-cylinder operation execution condition.

(Throttle Valve Control Unit)

The throttle valve control unit 115 controls the actuator 26 to change the opening of the throttle valve 25 to achieve the target indicated torque.

As the number of the operating cylinders is reduced in the reduced-cylinder operation, each air filling efficiency of the operating cylinders have to be made higher than that of the operating cylinders in the all-cylinder operation so that the output of each of the operating cylinders in the reduced-cylinder operation (the second and the third cylinders) becomes higher than the output of each of the operating cylinders in the all-cylinder operation. As described above, in the preparatory stroke, the throttle valve control unit 115 executes the air amount increasing control for increasing the opening of the throttle valve 25 to increase the amount of intake air to be introduced into the respective combustion chambers 11 (increasing air amount of each cylinder). Specifically, in this state, the opening of the throttle valve 25 is gradually increased.

In the embodiment, as described above, in the preparatory stroke, execution of the air amount increasing control is started to start increasing the opening of the throttle valve 25 after the end of the correction control (after the end of the boosting operation of the oil pressure if the correction control is not executed), which is executed by the exhaust variable valve timing mechanism 20.

Meanwhile, in transition from the reduced-cylinder operation to the all-cylinder operation, each air filling efficiency of the cylinders has to be made lower than the value in the reduced-cylinder operation. Upon establishment of the all-cylinder operation execution condition, the throttle valve control unit 115 executes an air amount decreasing control for decreasing the amount of intake air to be introduced into the respective combustion chambers 11 (decreasing each air amount of the respective cylinders) by decreasing the opening of the throttle valve 25.

As described above, each air filling efficiency of the respective cylinders cannot be lowered immediately after changing the opening of the throttle valve 25. Accordingly, there may be the risk of making the engine torque larger than the required value in spite of starting the air amount decreasing control. Upon establishment of the all-cylinder operation execution condition, the embodiment executes the air amount decreasing control, and a control for retarding the ignition period behind the basic ignition period to be described later. The air amount decreasing control is started simultaneously with the start of the control executed by the variable valve timing mechanisms 19, 20 for advancing phases of the intake valve 41 and the exhaust valve 51.

(Ignition Period Control Unit)

The ignition period control unit 113 will be described.

The ignition period control unit 113 determines the ignition period in accordance with the operational state of the vehicle, and outputs a command to the spark plug 13. The ignition period control unit 113 preliminarily stores a map (not shown) representing a relation among the engine speed, the engine load calculated from the engine speed and the accelerator opening, and the ignition period. The ignition period control unit 113 extracts the ignition period from the map, and corrects the extracted ignition period based on the intake air pressure detected by the intake air pressure sensor 97 so as to set the basic ignition period.

Two kinds of ignition period maps are prepared for the all-cylinder operation and the reduced-cylinder operation, respectively. In the all-cylinder operation, the ignition period control unit 113 extracts the ignition period corresponding to the engine speed and the engine load from the map for the all-cylinder operation, and corrects the extracted ignition period by utilizing the intake air pressure to set the basic ignition period. In the reduced-cylinder operation, the ignition period control unit 113 extracts the ignition period corresponding to the engine speed and the engine load from the map for the reduced-cylinder operation, and corrects the extracted ignition period by utilizing the intake air pressure to set the basic ignition period.

The basic ignition period is set to achieve the required engine torque or the engine load in the state where each air filling efficiency of the cylinders is controlled to the target air filling efficiency. If each air filling efficiency of the cylinders is controlled to the target air filling efficiency in the normal all-cylinder operation, the ignition period is set to the basic ignition period for the all-cylinder operation. If each air filling efficiency of the cylinders is controlled to the target air filling efficiency in the normal reduced-cylinder operation, the ignition period is set to the basic ignition period for the reduced-cylinder operation.

In transition to the reduced-cylinder operation, the above-described air amount increasing control will be executed. Therefore, under the air amount increasing control, each air filling efficiency of the cylinders is larger than the target air filling efficiency in the all-cylinder operation. Assuming that the ignition period is set to the basic ignition period for the all-cylinder operation under the air amount increasing control, the engine torque becomes larger than the required value. The ignition period control unit 113 retards the ignition period behind the basic ignition period (basic ignition period for all-cylinder operation) during execution of the air amount increasing control. The ignition period retard control will be stopped at the start of the reduced-cylinder operation. At the start of the reduced-cylinder operation, the ignition period is set to the basic ignition period for the reduced-cylinder operation.

In response to establishment of the all-cylinder operation execution condition, the ignition period control unit 113 retards the ignition period behind the basic ignition period as described above. Specifically, in response to establishment of the all-cylinder operation execution condition, the ignition period control unit 113 retards the ignition period behind the basic ignition period by relatively a large amount. The ignition period control unit 113 then gradually advances the ignition period as the air filling efficiency of each cylinder is decreased under the air amount decreasing control. The advancing control will be stopped when the air filling efficiency of each cylinder reaches the target air filling efficiency in the all-cylinder operation. Thereafter, the ignition period is set to the basic ignition period for the all-cylinder operation.

In transition to the reduced-cylinder operation, and after establishment of the all-cylinder operation execution condition, the retarding amount of the ignition period behind the basic ignition period is set to be inversely proportional to the amount of internal EGR gas in the cylinder bore 9 of each cylinder.

(Fuel Control Unit)

The fuel control unit 114 determines a fuel injection amount as the amount of the fuel injected from the injector 12 in accordance with operational states, and a timing of fuel ignition from the injector 12 so that an injection execution command is output to the injector 12. The fuel control unit 114 stores a fuel injection map (not shown) which preliminarily sets a correlation with the target indicated torque. Based on the map, the fuel injection amount and the timing are set.

The fuel control unit 114 switches control operations of the injector 12 of the idle cylinder (the first and the fourth cylinders) depending on the all-cylinder operation or the reduced-cylinder operation. That is, in the all-cylinder operation, the fuel control unit 114 drives the injectors 12 of the first to the fourth cylinders to execute the fuel injection. Meanwhile, in the reduced-cylinder operation, the fuel control unit 114 inhibits the injector 12 of the idle cylinders (the first and the fourth cylinders) to inject the fuel.

(Valve-Stopping Mechanism Control Unit)

The valve-stopping mechanism control unit 116 will be described.

The valve-stopping mechanism control unit 116 switches control operations of the exhaust-side second direction switch valve 85, the intake-side second direction switch valve 86, and the linear solenoid valve 89 depending on the all-cylinder operation or the reduced-cylinder operation.

In the all-cylinder operation, the valve-stopping mechanism control unit 116 brings the exhaust-side second direction switch valve 85 and the intake-side second direction switch valve 86 into OFF states. This makes it possible to open and close the intake and exhaust valves 41, 51 of the first to the fourth cylinders. Meanwhile, in the reduced-cylinder operation, the valve-stopping mechanism control unit 116 drives the linear solenoid valve 89 to boost the oil pressure in the oil passage 70 to the target oil pressure for switching as described above, and brings the exhaust-side second direction switch valve 85 and the intake-side second direction switch valve 86 into ON states so that the oil pressure supplied to the HLA 14 of the idle cylinder is retained at a holding oil pressure. In the above-described manner, the intake and exhaust valves 41, 51 of the idle cylinder are held closed.

In switching to the reduced-cylinder operation, after each air filling efficiency of the cylinders reaches the target value in the reduced-cylinder operation, the valve-stopping mechanism control unit 116 allows the HLA 14 to hold the exhaust valve 51 of the idle cylinder closed while holding the exhaust-side second direction switch valve 85 in ON state. Subsequent to the operation for holding the exhaust valve 51 closed, the valve-stopping mechanism control unit 116 allows the HLA 14 to hold the intake valve 41 closed while holding the intake-side second direction switch valve 86 in ON state.

In switching to the all-cylinder operation, the valve-stopping mechanism control unit 116 brings the exhaust-side second direction switch valve 85 into OFF state to make the exhaust valve 51 of the idle cylinder ready for opening. After opening the exhaust valve 51 of the idle cylinder, the valve-stopping mechanism control unit 116 brings the intake-side second direction switch valve 86 into OFF state to make the intake valve 41 of the idle cylinder ready for opening.

As described above, in switching to the all-cylinder operation, the exhaust valve 51 of the idle cylinder is opened prior to opening of the intake valve 41 of the idle cylinder.

(Exhaust Shutter Valve Control Unit)

The exhaust shutter valve control unit 117 will be described.

In the reduced-cylinder operation, the exhaust shutter valve control unit 117 controls the exhaust shutter valve 35 into a valve closing side (where the exhaust flow rate is reduced). When the exhaust shutter valve 35 is brought into the valve closing side, the flow rate of the exhaust gas flowing through the exhaust pipe 34 is reduced as described above. Meanwhile, in the all-cylinder operation, the exhaust shutter valve control unit 117 controls the exhaust shutter valve 35 so that the pressure at the section of the exhaust passage 130 upstream of the exhaust shutter valve 35 becomes equal to or lower than the set pressure (for example, sealing pressure of the exhaust valve 51).

The exhaust shutter valve 35 is controlled to be brought into the valve closing side in the reduced-cylinder operation for the purpose of suppressing noise. Specifically, the number of operating cylinders is different between the reduced-cylinder operation and the all-cylinder operation, and accordingly, the resultant frequency of pulsation of the exhaust gas flowing through the exhaust passage 130 becomes different. In the reduced-cylinder operation, the vibration generated in the exhaust passage will be increased to cause the risk of increasing noise. The exhaust gas vibration in the exhaust passage as a cause of noise increase may be reduced by bringing the exhaust shutter valve 35 into the valve closing side in the reduced-cylinder operation to decrease the amount of exhaust gas flowing through the exhaust passage.

An explanation will be made with respect to control process steps executed by the ECU 110 based on a flowchart of FIG. 10 and a timing chart of FIG. 11.

The following explanation will be made on the assumption that the basic ignition period in the reduced-cylinder operation is the same as the basic ignition period in the all-cylinder operation.

The code Si (i=1, 2 . . . ) denotes each step for the respective processes, and t1 to t12 denote time points in the timing chart.

Figure 10:
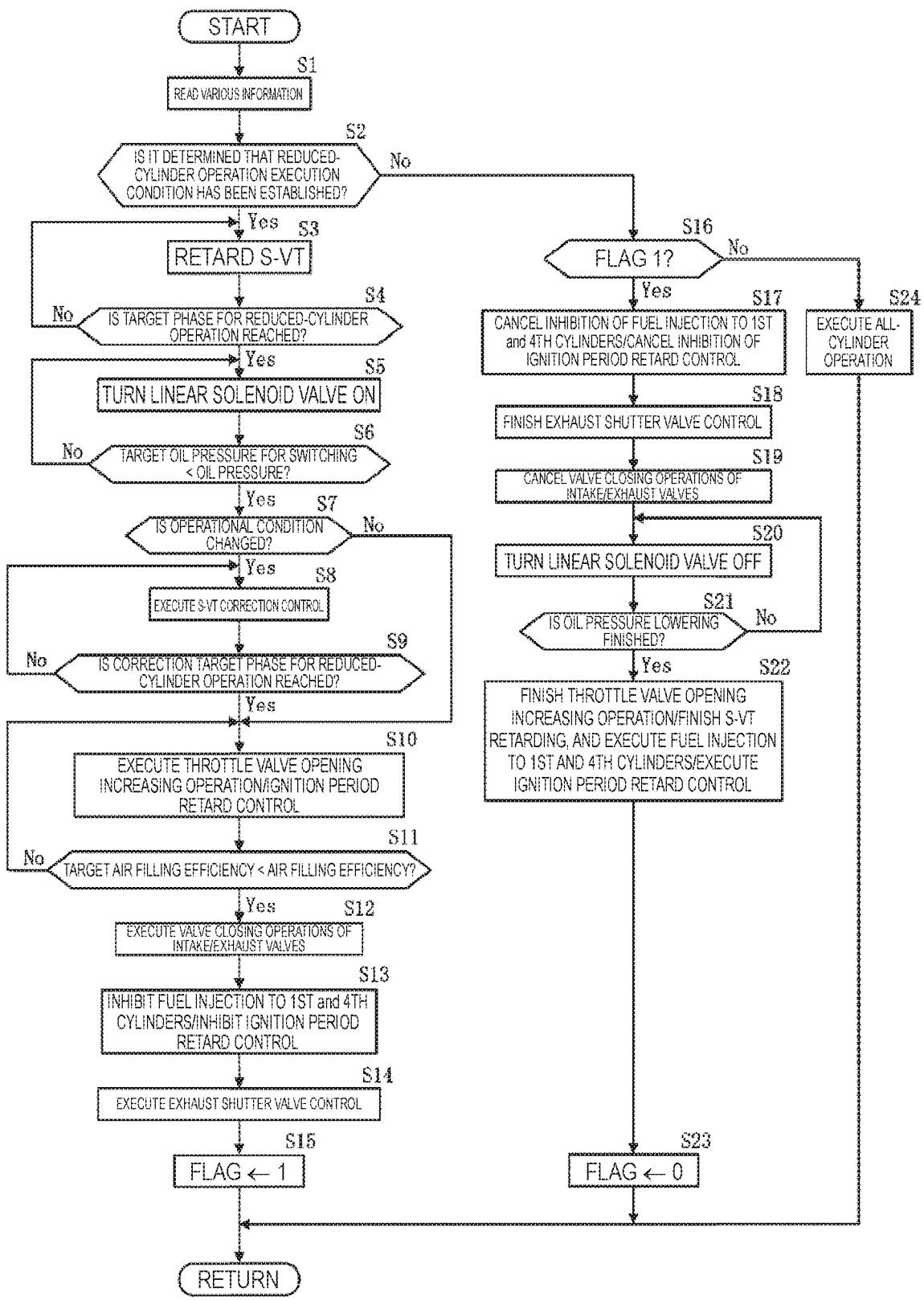
FIG. 10 is a flowchart showing a control process executed by a control device for an engine.
Figure 11:
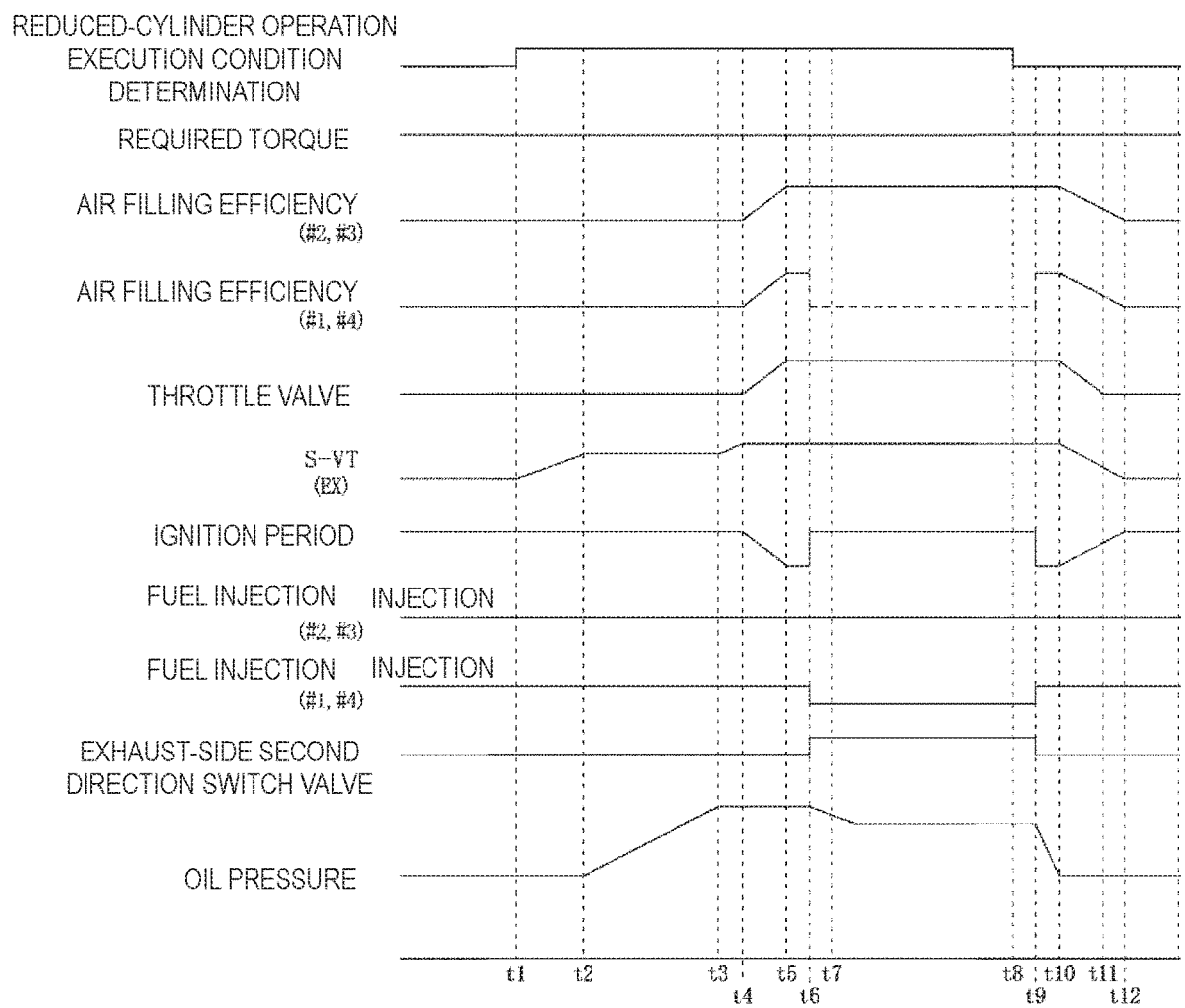
FIG. 11 is a timing chart showing each change in parameters with time.

Referring to the flowchart of FIG. 10, the ECU 110 reads output values of the respective sensors 90 to 100, the respective maps, and various information in step S1, and proceeds to step S2.

In step S2, it is determined whether or not the reduced-cylinder operation execution condition has been established. As described above, in the embodiment, if the engine is operated in the reduced-cylinder operation region A2 in the map M, it is determined that the reduced-cylinder operation execution condition has been established.

If it is determined that the reduced-cylinder operation execution condition has been established (t1) in step S2, the preparatory stroke for the reduced-cylinder operation is executed. In step S3, a retarding operation is executed to the intake and exhaust valves 41, 51. Specifically, the variable valve timing mechanisms 19, 20 are controlled to gradually retard the timings of the intake and exhaust valves 41, 52. The process then proceeds to step S4.

In step S4, it is determined whether or not the phase of the exhaust valve 51 has reached the target phase for the reduced-cylinder operation.

If it is determined that the phase of the exhaust valve 51 has reached the target phase for the reduced-cylinder operation (t2) in step S4, the process proceeds to step S5 where the linear solenoid valve 89 is driven (brought into ON state) to boost the oil pressure of the oil passage 70. The process then proceeds to step S6.

At the time point t2 where the phase of the exhaust valve 51 has reached the target phase for the reduced-cylinder operation, application of the oil pressure to the exhaust variable valve timing mechanism 20 is stopped. This may suppress fluctuation in the oil pressure accompanied with change in the phase of the exhaust valve 51.

If it is determined in step S4 that the phase of the exhaust valve 51 has not reached the target phase for the reduced-cylinder operation, the process returns to step S3 where the retarding operation is continuously executed to the phase of the exhaust valve 51.

In step S6, it is determined whether or not the oil pressure of the oil passage 70 has exceeded the target oil pressure for switching.

If it is determined in step S6 that the oil pressure of the oil passage 70 has exceeded the target oil pressure for switching (t3), the process proceeds to step S7 where it is determined whether or not the operational state of the engine has been changed during boosting of the oil pressure of the oil passage 70.

Meanwhile, if it is determined in step S6 that the oil pressure of the oil passage 70 has not exceeded the target oil pressure for switching, the process returns to S5 where the oil pressure of the oil passage 70 is continuously boosted while holding the linear solenoid valve 89 driven (in ON state).

Determination in step S7 that the operational state of the engine has been changed during boosting of the oil pressure of the oil passage 70 indicates inadaptability of the target phase for the reduced-cylinder operation to the current operational state of the engine. In this case, the process proceeds to step S8 where the exhaust-side first direction switch valve 84 is further operated to allow the exhaust variable valve timing mechanism 20 to execute the correction control of the phase of the exhaust valve 51. The process then proceeds to S9 from step S8.

In step S9, it is determined whether or not the phase of the exhaust valve 51 has reached the target correction phase for the reduced-cylinder operation.

If it is determined in step S9 that the phase of the exhaust valve 51 has reached the target correction phase for the reduced-cylinder operation (t4), the process proceeds to step S10.

Meanwhile, if it is determined in step S9 that the phase of the exhaust valve 51 has not reached the target correction phase for the reduced-cylinder operation, the process returns to step S8 where the variable valve timing mechanism correction control to the exhaust valve 51 is continuously executed.

Determination in step S7 that the operational state of the engine has not changed during boosting of the oil pressure of the oil passage 70 indicates adaptability of the target phase for the reduced-cylinder operation to the current operational state of the engine. In this case, the process proceeds to step S10.

Step S10 starts executing the opening of the throttle valve increasing operation (air amount increasing control) for increasing the opening of the throttle valve 25, and an ignition period retard control for retarding the ignition period (t4). The process then proceeds to step S11.

In step S11, it is determined whether or not each air filling efficiency of the cylinders has exceeded the target air filling efficiency as the target value thereof for the reduced-cylinder operation.

If it is determined in step S11 that the air filling efficiency has exceeded the target air filling efficiency for the reduced-cylinder operation (t5), the intake-side second direction switch valve 86 and the exhaust-side second direction switch valve 85 are brought into ON states so that the intake and exhaust valves 41, 51 of the idle cylinders (the first and the fourth cylinders) are held closed (S12). The process then proceeds to step S13.

As described above, the operation for holding the closed state of the exhaust valve 51 is started slightly earlier than starting the operation for holding the closed state of the intake valve 41.

If it is determined in step S11 that the air filling efficiency has not exceeded the target air filling efficiency in the reduced-cylinder operation, the process returns to step S10 where the executing the opening of the throttle valve increasing operation is continuously executed.

In step S13, after completion of holding closed states of the intake and exhaust valves 41, 51 of the idle cylinders, fuel injection to the first and the fourth cylinders is inhibited. Execution of the ignition period retard control is also inhibited so as to set the ignition period to the basic ignition period for the reduced-cylinder operation. In this case, as the basic ignition period in the reduced-cylinder operation is the same as the one in the all-cylinder operation as described above, the ignition period is returned to the original value (t6). The process then proceeds to S14.

At this time point, the oil pressure applied to the HLA 14 is adjusted from the target oil pressure for switching to the closed valve holding oil pressure (holding oil pressure). The reduced-cylinder operation is started at t7 owing to the follow-up property of the oil pressure. Therefore, the time period from t5 to t7 is a transitional period to the reduced-cylinder operation.

In step S14, the exhaust shutter valve 35 is controlled to be brought into the valve closing side so that the flow rate of the exhaust gas is reduced. Thereafter, the flag is changed to 1 (S15) to return the process. The flag is set to 0 in the all-cylinder operation, and set to 1 in the reduced-cylinder operation.

When the engine is not operated in the reduced-cylinder operation region A2 of the map M, it is determined in step S2 that the reduced-cylinder operation execution condition has not been established. In this case, the process proceeds to step S16 where it is determined whether or not the flag is set to 1.

Determination in step S16 that the flag is not set to 1 indicates the previous operational state for the all-cylinder operation. Therefore, the all-cylinder operation is continuously executed (S24), and the process returns.

Meanwhile, determination in step S16 that the flag is set to 1 indicates establishment of the all-cylinder operation execution condition in the reduced-cylinder operation (t8). If it is determined in step S16 that the flag is set to 1, the process proceeds to step S17.

In step S17, both inhibition of executing fuel injection to the first and the fourth cylinders, and inhibition of executing ignition period retard control are canceled (t9), and the process proceeds to step S18.

Releasing inhibition to execute the ignition period retard control may temporarily return the command value of the ignition period for the idle cylinder to the one at the start of the reduced-cylinder operation. As releasing of the closed valve holding of the intake and exhaust valves 41, 51 of the first and the fourth cylinders has not been completed yet, the injector 12 and the spark plug 13 are not in actual operational states.

In step S18, the exhaust shutter valve control is terminated, and the process proceeds to step S19. In step S19, the valve closing operation to the intake and exhaust valves 41, 51 of the idle cylinder is canceled. Then in step S20, the linear solenoid valve 89 is brought into OFF state. The process then proceeds to step S21 from step S20. The valve opening operation to the exhaust valve 51 is started earlier than the valve opening operation to the intake valve 41.

In step S21, it is determined whether or not the oil pressure applied to the HLA 14 has been lowered from the closed valve holding oil pressure to the target oil pressure in the all-cylinder operation.

If it is determined in step S21 that the oil pressure applied to the HLA 14 has not been lowered from the closed valve holding oil pressure to the target oil pressure in the all-cylinder operation, the process returns to S20 where the OFF state of the linear solenoid valve 89 is further held to allow continuous lowering of the pressure.

Meanwhile, if it is determined in step S21 that the oil pressure applied to the HLA 14 has been lowered from the closed valve holding oil pressure to the target oil pressure in the all-cylinder operation (t10), the process proceeds to step S22. If the oil pressure applied to the HLA 14 is lowered from the closed valve holding oil pressure to the target oil pressure in the all-cylinder operation, the intake and exhaust valves 41, 51 of the first and the fourth cylinders are made ready for opening and closing so that the all-cylinder operation becomes executable. Therefore, the all-cylinder operation is started at t10 upon completion of releasing the operation for holding the closed valve operation of the intake and exhaust valves 41, 51 of the first and the fourth cylinders.

In step S22, execution of a executing the opening of the throttle valve decreasing operation (air amount decreasing control) for gradually decreasing the opening of the throttle valve 25 is started. As FIG. 11 shows, the operation allows each air filling efficiency of the cylinders to be gradually decreased toward the target value for the all-cylinder operation after the time t9 at which the oil pressure applied to the HLA 14 has been lowered to the target oil pressure in the all-cylinder operation. Each air filling efficiency of the idle cylinders (the first and the fourth cylinders) will be temporarily increased by opening the intake and exhaust valves 41, 51.

In step S22, the phases of the intake and exhaust valves 41, 51 are advanced. Specifically, the variable valve timing mechanisms 19, 20 are controlled to gradually advance the phases of the intake and exhaust valve 41, 51 toward the target phases for the all-cylinder operation from the target phases for the reduced-cylinder operation.

Step S22 starts fuel injection and ignition simultaneously to the idle cylinders (the first and the fourth cylinders). At this moment, the ignition period is set to the period on the retarding side behind the basic ignition period for the all-cylinder operation (referring to an example of FIG. 11, it is the same period as the one in switching to the reduced-cylinder operation). Thereafter, the ignition period is gradually advanced toward the basic ignition period for the all-cylinder operation.

Under the air amount decreasing control and the advancing control to the intake and exhaust valves 41, 51, the control for decreasing the opening of the throttle valve 25 is stopped at the time t11. Then phases of the intake and exhaust valves 41, 51 reach the target phases for the all-cylinder operation, and each air filling efficiency of the cylinders reaches the target value of air filling efficiency for the all-cylinder operation at the time t12.

The process proceeds from step S22 to step S23. In step S23, the flag is changed to 0, and the process returns.

Functions and effects of the above-described control device for an engine will be described.

In response to establishment of the reduced-cylinder operation execution condition, the ECU 110 of the control device allows the exhaust variable valve timing mechanism 20 to change the phase of the exhaust valve 51. This makes it possible to increase the torque by highly expanding the combustion gas, and to reduce the pumping loss.

In response to establishment of the reduced-cylinder operation execution condition, the ECU 110 allows the exhaust variable valve timing 20 to change the phase of the exhaust valve 51, and allows the valve-stopping mechanism 14b to bring the intake and exhaust valves 41, 51 of the idle cylinders (the first and the fourth cylinders) into closed states. It is therefore possible to suppress lowering or fluctuation of the oil pressure applied to the valve-stopping mechanism 14b as a result of oil pressure consumption by the exhaust variable valve timing 20.

Suppressing the oil pressure fluctuation owing to the operation of the exhaust variable valve timing 20 allows the time period for the valve-stopping mechanism 14b to be reduced. This makes it possible to securely provide the effects of improving the fuel consumption and stabilizing the engine torque while reducing the time period for switching to the reduced-cylinder operation.

In response to establishment of the reduced-cylinder operation execution condition, the ECU 110 allows the exhaust variable valve timing 20 to change the phase of the exhaust valve 51 to the target phase for the reduced-cylinder operation (target phase for switching to the reduced-cylinder operation), and allows the valve-stopping mechanism 14b to start the oil pressure adjustment (boosting the oil pressure of the oil passage 70) for bringing the intake and exhaust valves 41, 51 of the idle cylinders into the closed states. This makes it possible to securely execute switching to the reduced-cylinder operation in the state where the phase of the exhaust valve 51 has been changed to the target phase for switching to the reduced-cylinder operation.

When the valve-stopping mechanism 14b adjusts the oil pressure for bringing the intake and exhaust valves 41, 51 of the idle cylinders into the closed states, the ECU 110 restrains the exhaust variable valve timing 20 from changing the phase of the exhaust valve 51. In the above-described state, as the oil pressure is not consumed by the exhaust variable valve timing 20, it is possible to securely suppress the oil pressure fluctuation of the valve-stopping mechanism 14b.

Especially, in the embodiment, when the valve-stopping mechanism 14b adjusts the oil pressure for bringing the intake and exhaust valves 41, 51 of the idle cylinders into the closed states, oil pressure applied to the exhaust variable valve timing 20 is stopped. This makes it possible to securely suppress the oil pressure fluctuation of the valve-stopping mechanism 14b.

At the end of the oil pressure adjustment by the valve-stopping mechanism 14b for bringing the intake and exhaust valves 41, 51 of the idle cylinders into the closed states, the ECU 110 allows the exhaust variable valve timing 20 to change the opening/closing timing of the exhaust valve 51 to the target phase in the reduced-cylinder operation. As a result, the phase of the exhaust valve 51 may be further appropriately adapted to the operational state of the engine toward the target phase which has been changed as needed during the oil pressure adjustment performed by the valve-stopping mechanism 14b. This makes it possible to provide effects of further improving the fuel consumption and further stabilizing the engine torque.

When the valve-stopping mechanism 14b adjusts the oil pressure for bringing the intake and exhaust valves 41, 51 of the idle cylinders into the closed states, the ECU 110 restrains the hydraulic exhaust variable valve timing 20 from changing the phase of the exhaust valve 51, and allows the electric intake variable valve timing mechanism 19 to change the phase of the intake valve 41. This makes it possible to set the phases of the intake and exhaust valves 41, 51 to the target phases without influencing the oil pressure of the valve-stopping mechanism 14b. That is, changing the phase of the intake valve 41 by the electric variable valve timing 19 allows setting of the phase of the intake valve 41 to the target phase in earlier stage. It is possible to set the phase of the exhaust valve 51 to the target phase using the hydraulic variable valve timing 20.

With the throttle valve control unit 115 capable of adjusting an amount of air supplied to the engine 1, in response to establishment the reduced-cylinder operation condition, the ECU 110 allows the exhaust variable valve timing mechanism 20 to change the phase of the exhaust valve 51, and allows the valve-stopping mechanisms 14b to start the oil pressure adjustment for bringing the intake and exhaust valves 41, 51 of the idle cylinders into the closed states. After the oil pressure applied to the valve-stopping mechanism 14b reaches the target oil pressure for switching, the throttle valve control unit 115 starts the air amount adjustment (increasing the opening of the throttle valve 25). This makes it possible to reduce the time period until the intake amount of each cylinder reaches the target value, and to suppress the fuel consumption deterioration.

After the oil pressure (oil pressure of the oil passage 70) applied to the valve-stopping mechanism 14b reaches the target oil pressure for switching, the ECU 110 allows the exhaust variable valve timing 20 to change the phase of the exhaust valve 51 to the target phase for the reduced-cylinder operation as the target value in the reduced-cylinder operation, and allows the throttle valve 25 to start the air amount adjustment. As the phase of the exhaust valve 51 is further corrected in accordance with the phase change which has been determined as needed in the oil pressure adjustment performed by the valve-stopping mechanism 14b. It is therefore possible to set the phase of the exhaust valve 51 more appropriately, and to provide the effects of further improving the fuel consumption and further stabilizing the engine torque.

The ECU 110 allows the ignition period control unit 113 for adjusting the ignition period of the engine 1 to the retarding side when adjusting the air amount using the throttle valve 25. This makes it possible to effectively suppress the torque shock accompanied with the air amount increase in switching to the reduced-cylinder operation.

An explanation will be made with respect to a modified example derived from partially modifying the above-described embodiment.

1] An example of the in-line four-cylinder gasoline engine has been described in the embodiment. However, the invention is applicable to the engine of arbitrary type, for example, the six-cylinder engine, V-type engine and the like without being limited to the in-line four-cylinder gasoline engine.

The engine in the example is adaptable to execute the reduced-cylinder operation by idling two of four cylinders. However, it is possible to set arbitrary number of the cylinders to be idled.

2] The embodiment has been described with respect to the use of the electric VVT for the intake valve, and the hydraulic VVT for the exhaust valve. It is possible to use the hydraulic VVT for at least one of those valves. It is also possible to use the hydraulic VVT for the intake valve, and use the electric VVT for the exhaust valve. It is still possible to use the hydraulic VVTs for both the intake and exhaust valves without using the electric VVT.

3] It is to be understood for those who skilled in the art that various modifications may be added to the embodiment, or embodiments may be arbitrarily combined without departing from the scope of the present invention. Those modifications are encompassed by the present invention.

The invention exemplified by the above-described specific embodiment is configured as follows.

The control device for an engine is applicable to the engine including a plurality of cylinders, and is configured to selectively execute the reduced-cylinder operation in which operations of some of the cylinders are suspended in the idle state, and the all-cylinder operation in which all the cylinders are operated. The control device includes a hydraulic valve-stopping mechanism which holds an intake valve and an exhaust valve of the idle cylinders in closed states in the reduced-cylinder operation, a hydraulic phase control mechanism which makes a phase of the intake valve or the exhaust valve of the engine variable, and a control unit which controls the hydraulic valve-stopping mechanism and the hydraulic phase control mechanism. In response to establishment of a reduced-cylinder operation execution condition as a condition for executing the reduced-cylinder operation, the control unit allows the hydraulic phase control mechanism to execute a phase change to the intake valve or the exhaust valve, and subsequently, allows the hydraulic valve-stopping mechanism to bring the intake valve and the exhaust valve of the idle cylinders to be held closed.

In response to establishment of the reduced-cylinder operation execution condition, the control unit of the control device for an engine allows the hydraulic phase control mechanism to change the phase of the intake valve or the exhaust valve. This makes it possible to increase the torque by highly expanding the combustion gas, and to reduce the pumping loss.

In response to establishment of the reduced-cylinder operation execution condition, the control unit allows the hydraulic phase control mechanism to execute the phase change to the intake valve or the exhaust valve, and subsequently allows the hydraulic valve-stopping mechanism to bring the intake valve and the exhaust valve of the idle cylinders into closed states. This makes it possible to suppress decrease in the oil pressure applied to the hydraulic valve-stopping mechanism owing to the oil pressure consumption of the hydraulic phase control mechanism.

The oil pressure decrease (fluctuation) owing to the operation of the hydraulic phase control mechanism is suppressed to reduce the time period for switching the hydraulic valve-stopping mechanism. This makes it possible to securely provide the effects of improving the fuel consumption and stabilizing the engine torque while suppressing the time period taken for switching to the reduced-cylinder operation.

Preferably, in response to establishment of the reduced-cylinder operation execution condition, the control unit allows the hydraulic phase control mechanism to change the phase of the intake valve or the exhaust valve to the target phase for switching to the reduced-cylinder operation, and subsequently allows the hydraulic valve-stopping mechanism to start the oil pressure adjustment for bringing the intake valve and the exhaust valve of the idle cylinders to be held closed.

The above-described structure allows switching to the reduced-cylinder operation while having the phase of the intake valve or the exhaust valve changed to the target phase for switching to the reduced-cylinder operation.

Preferably, the control unit restrains the hydraulic phase control mechanism from changing the phase of the intake valve or the exhaust valve when the hydraulic valve-stopping mechanism adjusts the oil pressure for bringing the intake valve and the exhaust valve of the idle cylinders into closed states.

The above-described structure securely suppresses the oil pressure fluctuation of the hydraulic valve-stopping mechanism as the oil pressure is hardly consumed by the hydraulic phase control mechanism.

When the hydraulic valve-stopping mechanism adjusts the oil pressure for bringing the intake valve and the exhaust valve of the idle cylinders to be held closed, preferably, the control unit stops oil pressure application to the hydraulic phase control mechanism so as to restrain the operation for changing the phase of the intake valve or the exhaust valve.

It is possible to securely suppress the oil pressure fluctuation of the hydraulic valve-stopping mechanism.

Preferably, after the hydraulic valve-stopping mechanism finishes the oil pressure adjustment for bringing the intake valve and the exhaust valve of the idle cylinders into closed states, the control unit allows the hydraulic phase control mechanism to change the phase of the intake valve or the exhaust valve to a target phase in the reduced-cylinder operation.

The above-described structure changes the phase of the intake valve or the exhaust valve in accordance with the phase change which has been determined as needed in the oil pressure adjustment performed by the hydraulic valve-stopping mechanism and thereby makes it possible to control the phase with high accuracy. This makes it possible to provide effects of further improving the fuel consumption and further stabilizing the engine torque.

The above-described structure includes the hydraulic phase control mechanism for making the phase of the exhaust valve for each of the cylinders variable, and an electric phase control mechanism for making the phase of the intake valve for each of the cylinders variable. When the hydraulic valve-stopping mechanism adjusts the oil pressure for bringing the intake valve and the exhaust valve of the idle cylinders to be held closed, preferably, the control unit restrains the hydraulic phase control mechanism from executing the phase change to the exhaust valve, and permits the electric phase control mechanism to execute the phase change to the intake valve.

As described above, it is possible to securely suppress the oil pressure fluctuation of the hydraulic valve-stopping mechanism while appropriately controlling the phases of the intake valve and the exhaust valve, respectively.

Preferably, an air amount adjustment unit capable of adjusting an amount of air supplied to the engine is provided. In response to establishment of the reduced-cylinder operation execution condition, the control unit allows the hydraulic phase control mechanism to execute the phase change to the intake valve or the exhaust valve, and subsequently allows the hydraulic valve-stopping mechanism to start the oil pressure adjustment for bringing the intake valve and the exhaust valve of the idle cylinders into the closed states. After the oil pressure applied to an oil passage communicated with the hydraulic valve-stopping mechanism reaches a predetermined target oil pressure, the control unit allows the air amount adjustment unit to start the air amount adjustment.

The above-described structure is possible to suppress the fuel consumption deterioration by reducing the time period taken for increasing the intake amount of each cylinder to the predetermined amount.

Preferably, after the oil pressure applied to the oil passage communicated with the hydraulic valve-stopping mechanism reaches the predetermined target oil pressure, the control unit allows the hydraulic phase control mechanism to change the phase of the intake valve or the exhaust valve to a target phase in the reduced-cylinder operation, and thereafter allows the air amount adjustment unit to start the air amount adjustment.

The above-described structure changes the phase of the intake valve or the exhaust valve in accordance with the phase change which has been determined as needed in the oil pressure adjustment performed by the hydraulic valve-stopping mechanism. This makes it possible to control those phases with high accuracy, and to provide the effects of further improving the fuel consumption and further stabilizing the engine torque.

With the ignition period adjustment unit for adjusting the ignition period in the engine, the control unit allows the ignition period adjustment unit to retard the ignition period in the air amount adjustment performed by the air amount adjustment unit.

The above-described structure allows effective suppression of the torque shock accompanied with air amount increase in switching to the reduced-cylinder operation.

The invention claimed is:

1. A control device for an engine, the control device comprising:
   a hydraulic valve stopper which holds an intake valve and an exhaust valve of at least one idle cylinder in a closed state in a reduced-cylinder operation, the control device being applicable to an engine including a plurality of cylinders, and configured to selectively execute a reduced-cylinder operation by setting at least one of the plurality of cylinders as the idle cylinder to be brought into an idle state, and an all-cylinder operation for operating all the plurality of cylinders;
   a hydraulic phase controller which makes a phase of the intake valve or the exhaust valve of the engine variable;
   processing circuitry configured to control the hydraulic valve stopper and the hydraulic phase controller, wherein
   in response to establishment of a reduced-cylinder operation execution condition as a condition for executing the reduced-cylinder operation, the processing circuitry allows the hydraulic phase controller to execute a phase change to the intake valve or the exhaust valve, and subsequently, allows the hydraulic valve stopper to bring the intake valve and the exhaust valve of the at least one idle cylinder to be held closed; and
   an air amount adjuster which adjusts an amount of air supplied to the engine, wherein
   in response to establishment of the reduced-cylinder operation execution condition, the processing circuitry allows the hydraulic phase controller to execute the phase change to the intake valve or the exhaust valve, and subsequently allows the hydraulic valve stopper to start oil pressure adjustment for bringing the intake valve and the exhaust valve of the at least one idle cylinder to be held closed, and
   after oil pressure applied to an oil passage communicated with the hydraulic valve stopper reaches a predetermined target oil pressure, the processing circuitry allows the air amount adjuster to start the air amount adjustment.

2. The control device for the engine according to claim 1, wherein in response to establishment of the reduced-cylinder operation execution condition, the processing circuitry allows the hydraulic phase controller to change the phase of the intake valve or the exhaust valve to a target phase for switching to the reduced-cylinder operation, and subsequently allows the hydraulic valve stopper to start an oil pressure adjustment for bringing the intake valve and the exhaust valve of the at least one idle cylinder to be held closed.

3. The control device for the engine according to claim 1, wherein when the hydraulic valve stopper adjusts the oil pressure for bringing the intake valve and the exhaust valve of the at least one idle cylinder to be held closed, the processing circuitry restrains the hydraulic phase controller from executing the phase change to the intake valve or the exhaust valve.

4. The control device for the engine according to claim 3, wherein when the hydraulic valve stopper adjusts the oil pressure for bringing the intake valve and the exhaust valve of the at least one idle cylinder to be held closed, the processing circuitry stops application of the oil pressure to the hydraulic phase controller so as to be restrained from executing the phase change to the intake valve or the exhaust valve.

5. The control device for Drill the engine according to claim 3, wherein after the hydraulic valve stopper finishes the oil pressure adjustment for bringing the intake valve and the exhaust valve of the idle cylinders into the closed state, the processing circuitry allows the hydraulic phase controller to change the phase of the intake valve or the exhaust valve to a target phase in the reduced-cylinder operation.

6. The control device for the engine according to claim 3, further comprising:
   the hydraulic phase controller which makes the phase of the exhaust valve for each of the plurality of cylinders variable; and
   an electric phase controller which makes the phase of the intake valve for each of the plurality of cylinders variable, wherein
   when the hydraulic valve stopper adjusts the oil pressure for bringing the intake valve and the exhaust valve of the at least one idle cylinder to be held closed, the processing circuitry restrains the hydraulic phase controller from executing the phase change to the exhaust valve, and permits the electric phase controller to execute the phase change to the intake valve.

7. The control device for the engine according to claim 1, wherein after the oil pressure applied to the oil passage communicated with the hydraulic valve stopper reaches the predetermined target oil pressure, the processing circuitry allows the hydraulic phase controller to change the phase of the intake valve or the exhaust valve to a target phase in the reduced-cylinder operation, and subsequently allows the air mount adjuster to start the air amount adjustment.

8. The control device for the engine according to claim 7, further comprising an ignition period adjuster that adjusts an ignition period in the engine, wherein
the processing circuitry allows the ignition period adjuster to retard the ignition period in the air amount adjustment performed by the air amount adjuster.

9. The control device for the engine according to claim 1, further comprising an ignition period adjuster that adjusts an ignition period in the engine, wherein
the processing circuitry allows the ignition period adjuster to retard the ignition period in the air amount adjustment performed by the air amount adjuster.

10. A control system comprising:
an engine including a plurality of cylinders;
a hydraulic valve stopper which holds an intake valve and an exhaust valve of at least one idle cylinder in a closed state in a reduced-cylinder operation, the control system being applicable to the engine, and configured to selectively execute a reduced-cylinder operation by setting at least one of the plurality of cylinders as the idle cylinder to be brought into an idle state, and an all-cylinder operation for operating all the plurality of cylinders;
a hydraulic phase controller which makes a phase of the intake valve or the exhaust valve of the engine variable;
processing circuitry configured to control the hydraulic valve stopper and the hydraulic phase controller, wherein
in response to establishment of a reduced-cylinder operation execution condition as a condition for executing the reduced-cylinder operation, the processing circuitry allows the hydraulic phase controller to execute a phase change to the intake valve or the exhaust valve, and subsequently, allows the hydraulic valve stopper to bring the intake valve and the exhaust valve of the at least one idle cylinder to be held closed; and
an air amount adjuster which adjusts an amount of air supplied to the engine, wherein
in response to establishment of the reduced-cylinder operation execution condition, the processing circuitry allows the hydraulic phase controller to execute the phase change to the intake valve or the exhaust valve, and subsequently allows the hydraulic valve stopper to start oil pressure adjustment for bringing the intake valve and the exhaust valve of the at least one idle cylinder to be held closed, and
after oil pressure applied to an oil passage communicated with the hydraulic valve stopper reaches a predetermined target oil pressure, the processing circuitry allows the air amount adjuster to start the air amount adjustment.

11. The control system according to claim 10, wherein in response to establishment of the reduced-cylinder operation execution condition, the processing circuitry allows the hydraulic phase controller to change the phase of the intake valve or the exhaust valve to a target phase for switching to the reduced-cylinder operation, and subsequently, allows the hydraulic valve stopper to start an oil pressure adjustment for bringing the intake valve and the exhaust valve of the at least one idle cylinder to be held closed.

12. The control system according to claim 10, wherein when the hydraulic valve stopper adjusts the oil pressure for bringing the intake valve and the exhaust valve of the at least one idle cylinder to be held closed, the processing circuitry restrains the hydraulic phase controller from executing the phase change to the intake valve or the exhaust valve.

13. The control system according to claim 12, wherein when the hydraulic valve stopper adjusts the oil pressure for bringing the intake valve and the exhaust valve of the at least one idle cylinder to be held closed, the processing circuitry stops application of the oil pressure to the hydraulic phase controller so as to be restrained from executing the phase change to the intake valve or the exhaust valve.

14. The control system according to claim 12, wherein after the hydraulic valve stopper finishes the oil pressure adjustment for bringing the intake valve and the exhaust valve of the at least one idle cylinder into the closed state, the processing circuitry allows the hydraulic phase controller to change the phase of the intake valve or the exhaust valve to a target phase in the reduced-cylinder operation.

15. The control system according to claim 12, further comprising:
the hydraulic phase controller which makes the phase of the exhaust valve for each of the plurality of cylinders variable; and
an electric phase controller which makes the phase of the intake valve for each of the plurality of cylinders variable, wherein
when the hydraulic valve stopper adjusts the oil pressure for bringing the intake valve and the exhaust valve of the at least one idle cylinder to be held closed, the processing circuitry restrains the hydraulic phase controller from executing the phase change to the exhaust valve, and permits the electric phase controller to execute the phase change to the intake valve.

16. The control system according to claim 10, wherein after the oil pressure applied to the oil passage communicated with the hydraulic valve stopper reaches the predetermined target oil pressure, the processing circuitry allows the hydraulic phase controller to change the phase of the intake valve or the exhaust valve to a target phase in the reduced-cylinder operation, and subsequently allows the air amount adjuster to start the air amount adjustment.

17. The control system according to claim 16, further comprising an ignition period adjuster that adjusts an ignition period in the engine, wherein
the processing circuitry allows the ignition period adjuster to retard the ignition period in the air amount adjustment performed by the air amount adjuster.

18. The control system according to claim 10, further comprising an ignition period adjuster that adjusts an ignition period in the engine, wherein
the processing circuitry allows the ignition period adjuster to retard the ignition period in the air amount adjustment performed by the air amount adjuster.

19. A control device for an engine; the control device comprising:
a hydraulic valve stopper which holds an intake valve and an exhaust valve of at least one idle cylinder in a closed state in a reduced-cylinder operation; the control device being applicable to an engine including a plurality of cylinders, and configured to selectively execute a reduced-cylinder operation by setting at least one of the plurality of cylinders as the idle cylinder to be brought into an idle state, and an all-cylinder operation for operating all the plurality of cylinders;

a hydraulic phase controller which makes a phase of the intake valve or the exhaust valve of the engine variable;

processing circuitry configured to control the hydraulic valve stopper and the hydraulic phase controller, wherein in response to establishment of a reduced-cylinder operation execution condition as a condition for executing the reduced-cylinder operation, the processing circuitry allows the hydraulic phase controller to execute a phase change to the intake valve or the exhaust valve, and subsequently, allows the hydraulic valve stopper to bring the intake valve and the exhaust valve of the at least one idle cylinder to be held closed, and wherein when the hydraulic valve stopper adjusts oil pressure for bringing the intake valve and the exhaust valve of the at least one idle cylinder to be held closed, the processing circuitry restrains the hydraulic phase controller from executing the phase change to the intake valve or the exhaust valve;

the hydraulic phase controller which makes the phase of the exhaust valve for each of the cylinders variable; and an electric phase controller which makes the phase of the intake valve for each of the cylinders variable, wherein when the hydraulic valve stopper adjusts the oil pressure for bringing the intake valve and the exhaust valve of the at least one idle cylinder to be held closed, the processing circuitry restrains the hydraulic phase controller from executing the phase change to the exhaust valve, and permits the electric phase controller to execute the phase change to the intake valve.

* * * * *